United States Patent [19]
Hario et al.

[11] Patent Number: 5,358,239
[45] Date of Patent: Oct. 25, 1994

[54] ROTATABLE PAPER DISCHARGE AND GUIDING DEVICE IN A SCANNER

[75] Inventors: Yutaka Hario; Kazuma Toyota, both of Tokyo, Japan

[73] Assignee: Mutoh Industries, Ltd., Tokyo, Japan

[21] Appl. No.: 225,089

[22] Filed: Apr. 8, 1994

Related U.S. Application Data

[63] Continuation of Ser. No. 973,619, Nov. 9, 1992, abandoned.

[30] Foreign Application Priority Data

| Nov. 26, 1991 | [JP] | Japan | 3-336165 |
| Nov. 26, 1991 | [JP] | Japan | 3-336166 |
| Nov. 26, 1991 | [JP] | Japan | 3-336167 |
| Nov. 26, 1991 | [JP] | Japan | 3-336168 |
| Nov. 26, 1991 | [JP] | Japan | 3-336169 |

[51] Int. Cl.$^5$ .................................................. B65H 39/10
[52] U.S. Cl. ............................ 271/303; 271/186; 271/65; 271/188
[58] Field of Search .................. 271/65, 303, 184–186, 271/188, 209, 213, 207

[56] References Cited

U.S. PATENT DOCUMENTS

| 3,416,863 | 12/1968 | Ralston | 271/303 X |
| 4,720,728 | 1/1988 | Kando | 271/209 X |
| 4,750,016 | 6/1988 | Kusumoto et al. | 271/65 X |
| 5,038,228 | 8/1991 | Takada | 271/186 X |
| 5,118,093 | 6/1992 | Makiura et al. | 271/65 X |
| 5,148,734 | 2/1993 | Yamaguchi | 271/303 X |

FOREIGN PATENT DOCUMENTS

| 449120 | 10/1991 | European Pat. Off. | 271/303 |
| 41348 | 2/1988 | Japan | 271/303 |
| 66053 | 3/1990 | Japan | 271/303 |
| 66054 | 3/1990 | Japan | 271/303 |
| 127358 | 5/1990 | Japan | 271/303 |
| 23763 | 1/1992 | Japan | 271/303 |
| 2152015 | 7/1985 | United Kingdom | 271/65 |

*Primary Examiner*—Robert P. Olszewski
*Assistant Examiner*—Boris Milef
*Attorney, Agent, or Firm*—Sughrue, Mion, Zinn, Macpeak & Seas

[57] ABSTRACT

Positions of mobile guiding plates 54 and 62 are changed over by manipulation, by operation of a panel of a controller or by a signal from a sensor for detecting a stiffness of an original. When the mobile guiding plates 54 and 62 are rotated to locations for guiding the original towards the front of the scanner proper 2 or the back of an original carrying passage of the scanner proper 2, the original carried to the back of the scanner proper 2 runs onto the mobile guiding plates 54 and 62, and makes a U-turn by being guided and discharged to the front of the scanner proper 2. When the mobile guiding plates 54 and 62 are rotated from the guiding position to another position, the original which is carried to the back of the scanner proper 2 is discharged as it is to the back of the scanner proper 2 without changing direction.

6 Claims, 26 Drawing Sheets

ROTATABLE PAPER DISCHARGE AND GUIDING DEVICE IN A SCANNER

This is a continuation of application Ser. No. 07/973,619 filed Nov. 9, 1992 now abandoned.

DESCRIPTION OF THE PRIOR ART

Heretofore in the paper-carrying type scanner, a one way original carrying system has been known in which an original inserted at the front of the scanner is read by a reading sensor in the scanner, and then, the original is discharged at the rear part of the scanner. Also, a system of returning the original has been known in which an original inserted at the front is read by a reading sensor in the scanner, and then, the original is caused to make a U-turn upwardly towards the front of the scanner from the rear part of the scanner, and the original is discharged at the front side of the scanner.

SUMMARY OF THE INVENTION

This invention relates to paper-carrying type scanners, and more particularly to paper discharge and guiding devices in which either a one-way original carrying passage for dropping and discharging an original inserted at the front of the scanner to the back of the scanner, or an inverted original carrying passage for guiding the original in a direction of returning to the front of the scanner from the back of the scanner, can be optionally chosen and installed.

With respect to the operating property of the scanner, the system of returning the original, in which the original inserted at the front of the scanner is read and then, is discharged at the front side, has been excellent. But in the case where the original is considerably heavier than thickness standard, or a material of the type that returns to its initial condition once it is bent like aluminum Kent paper, and if the original is bent by the guiding operation of a guiding plate in a U-turn direction in the course of the original returning to the front of the scanner, there is a problem that this bend will remain.

Also, in the original one-way carrying system, the problem of the original bending does not occur, but the original is discharged at an inconvenient place where it is troublesome for the operator to reach.

The primary objects of this invention are to solve the foregoing problems.

In order to achieve the foregoing objects, in the paper-carrying type scanner in which the original from the front of the scanner is carried to a reading surface on a reading sensor by rollers for paper-carrying in the scanner, and moreover, the original is carried to the back of the scanner, and discharged, the invention is constructed in such a way that a mobile guiding plate for guiding the original forward from the rear part of the scanner is disposed at the rear part of the original carrying passage of the scanner, and this mobile guiding plate is supported on the scanner side to rotate between a position where the original is guided towards the front of the scanner, and a position separated from the guide position.

When the mobile guiding plate is transferred to a position for guiding the original towards the front of the scanner, the original inserted at the front of the scanner is read by the reading sensor in the scanner, and then, is carried to the rear part of the scanner. At this time, the original runs on the mobile guiding plate, and is guided by the mobile guiding plate to be discharged at the front side of the scanner. When the guiding plate is transferred to a position separated from the front guiding position, the original, transferred to the rear part of the scanner, is discharged and dropped at the rear part of the scanner without being guided to the front of the scanner.

Another object of this invention is, in the case where the original has a downward curving tendency toward the front of the scanner, to guide the original carried from the front of the scanner in a U-turn direction towards the front of the scanner by the mobile guiding plate.

In order to achieve the foregoing object, this invention is constructed in such a way that the mobile guiding plate is formed with a guiding surface to guide the original upward at an angle, a convex portion provided at approximately a central position of the guide surface to turn an upward direction from the original to a direction towards the front of the scanner, and an engaging portion to engage an edge of the original riding along the convex portion.

When the mobile guiding plate is transferred to a position for guiding the original, the original transferred to the back from the front of the scanner proper reaches the mobile guiding plate, and it is guided by the guiding plate upward at an angle. When this original reaches the convex portion of the mobile guiding plate, it is guided forward by the convex portion in the direction of the discharge.

When the original is downwardly curved, and if the original rides across the convex portion, the edge of the original is engaged by the engaging portion. If the original is moved along the mobile guiding plate even in this condition, the portion at the edge of the original is curved towards the front of the scanner. When this curved portion becomes big, the edge of the original is released from the engaging portion by the dead weight of the curved portion, tilting the portion near the edge of the original to the front part of the scanner and transferring it in the direction of the front discharge of the scanner.

A further object of this invention is to provide a paper discharge and guiding device in which either a one-way original-carrying passage for dropping and discharging an original which is inserted in the front of a scanner to the back of the scanner, or a passage for returning the original which guides the original and returns it to the front of the scanner from the back of the scanner, according to the stiffness of the original, can be optionally chosen and installed.

In order to achieve the foregoing object, in a paper-carrying type scanner for carrying the original from the front of the scanner to a reading surface on the reading sensor by the rotation of rollers for carrying paper in the scanner and carrying the original to the back of the scanner, the scanner of this invention comprises a mobile guiding plate journalled tiltably at the back of the scanner; an energizing means for moving the mobile guiding plate in an upright direction; a stopper for engaging the mobile guiding plate at an angle; and a discharge guiding plate having a guiding surface for guiding the original which is guided upwards at an angle by the mobile guiding plate and being positioned above the mobile guiding plate and provided at the side of the scanner proper, whereby the strength of the energizing force of the energizing means is set to a degree that the mobile guiding plate is pressed down by the pressure of the original, which is moving forward, and which does not have a suitable stiffness for being guided around a curve.

With the foregoing construction, in the case where the paper is of a material having weak stiffness and being suitable for the curve, the original is carried to the rear part of the scanner, is guided to the mobile guiding plate which is tilting upwards, is carried on to the guiding plate for discharge and its forward motion is redirected to the front of the scanner. In the case where the original has strong stiffness such as aluminum Kent paper, the original is discharged to the rear end of the scanner as it presses down the mobile guiding plate by the pressure of its forward motion and passes the mobile guiding plate.

Furthermore, in order to achieve the foregoing object, this invention is provided with a guide plate driving device for driving the mobile guiding plate between a position for guiding the original to the front of the scanner and a position separated from the guide position. A stiffness detection sensor detects the stiffness of the original at the upper flow side of the mobile guiding plate, and the guide plate driving device is controlled by a controller. The controller drives the driving device when the stiffness of the original is above a predetermined level on the basis of the signal from the stiffness detection sensor and the driving device transfers the mobile guiding plate to a position separated from the position for guiding the original towards the front of the scanner proper. The controller also drives the driving device when the stiffness of the original is below the predetermined level and the driving device transfers the mobile guiding plate to a position for guiding the original towards the front of the scanner proper.

A still further object of this invention is to provide a paper discharge and guiding device which enables either: a one-way original-carrying passage for dropping and discharging an original which is inserted in the front of the scanner to the rear part of the scanner by the operation of an operation panel on the scanner, or a reverted original carry passage for guiding the original to a return direction towards the front of the scanner from the rear part of the scanner. The two transport passages can be changed over by operating the control panel on the scanner.

This invention is capable of transferring the mobile guiding plate to a position for guiding the original towards the front of the scanner by operating the control panel to drive the driving device. In this case, the original inserted in the front of the scanner is read by the reading sensor in the scanner. It is then carried to the rear part of the scanner. At this time, the original is guided by the mobile guiding plate, then discharged at the front side of the scanner. When the control panel is operated to drive the driving device and the mobile guiding plate is transferred to a position separated from the position for guiding the original to the front of the scanner, the original which is transferred to the rear part of the scanner is discharged and dropped to the rear part of the scanner without being guided to the front of the scanner.

DETAILED DESCRIPTION OF THE PREFERRED EMBODIMENTS

Figure 1:
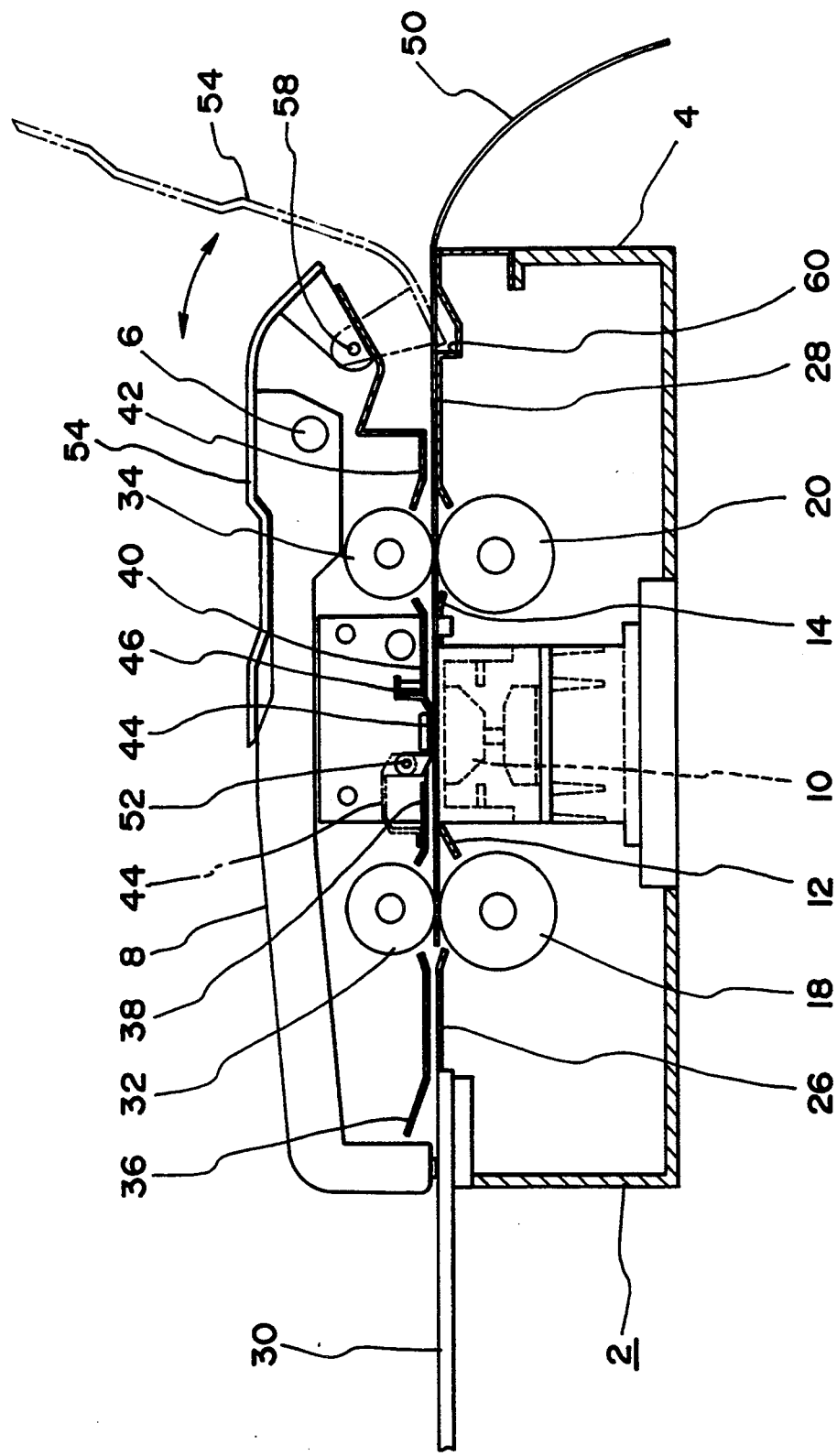
FIG. 1 is a cross section of a paper-carrying type scanner.
Figure 2:
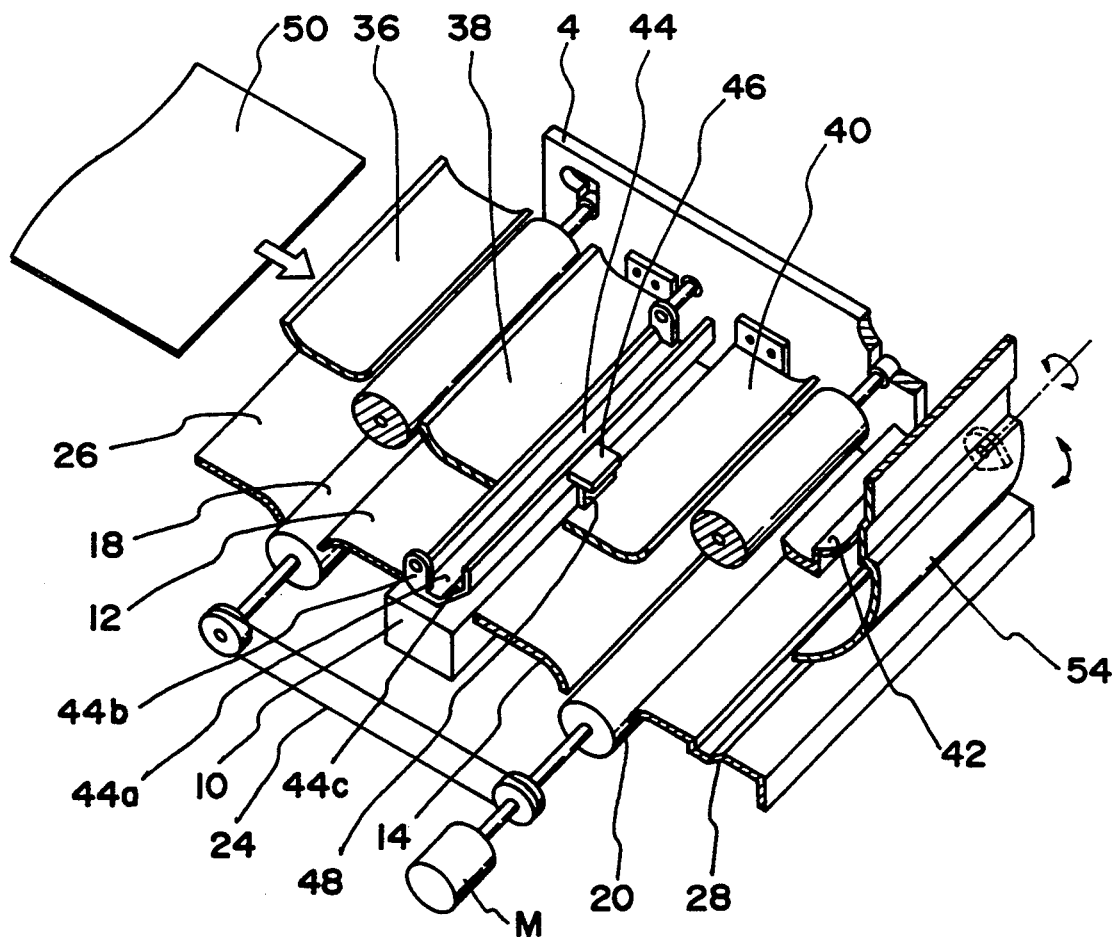
FIG. 2 is a sketch showing the internal structure of the paper-carrying type scanner.

The construction of a first embodiment will be described in detail in the following by referring to FIG. 1 to FIG. 4. Reference numeral 2 denotes a paper-carrying type scanner, and is comprised of a base 4, and an upper cover 8 journalled on the base 4. Almost in the center of the base 4, a reading sensor 10 is placed, and this sensor 10 is connected to a controller (not shown) which is built in the base 4.

At the front and the rear of the reading sensor 10, paper-carrying guides 12 and 14 are provided. In the upper part of the reading unit of the reading sensor 10, a transparent reading surface having a paper support surface is provided. Reference numerals 18 and 20 denote drive rollers journalled on the base 4 rotatably, and these drive rollers 18 and 20 are connected to a drive motor M, built in the base 4, by means of a power transmitting mechanism 24.

The drive motor M is controlled by the controller. Paper guides 26 and 28 are fixed on the base 4 and are positioned in the front of the front drive roller 18 and at the rear of the rear drive roller 20. Reference numeral 30 denotes a table for paper-carrying, and is fixed to the front end of the base 4.

Reference numerals 32 and 34 denote a front follower roller and a rear follower roller, which are liftably journalled on base 4 and rotatable. They abut, by the dead weight, on the corresponding drive rollers 18 and 20. Reference numerals 36, 38, 40 and 42 denote paper carrying guides placed on the base 4, and are opposed to corresponding carry guides 26, 12, 14 and 28. Reference numeral 44 denotes a shading plate, which is composed of a flat plate 44a, a front rising portion 44b and a rear rising portion 44c. As a whole, its cross-section is a U-shape.

The rising portion 44b is journalled on a side plate of the base 4 by means of a rotary support shaft 52 which is horizontal to the reading surface of the reading sensor 10 and rotatable on an axis line perpendicular to the direction the original is carried. At an upper end of the rising portion 44c, a receiving member 46 is fixed, and the receiving member 46 abuts on the upper surface of a support member 48, which is fixed to the paper carrying guide 40, by the dead weight of the shading plate 44.

In the condition where the receiving member 46 is engaged on the support member 48, a white surface of a flat plate portion 44a is parallelly opposed to a reading surface on a read unit of the reading sensor 10 at a predetermined interval. The gap between the flat plate portion 44a and the reading surface is set to a dimension identical to that of the thickness of normal paper.

Reference numeral 54 denotes a mobile guiding plate, which has mounting plates 56 fixed to both sides. The mounting plates 56 are positioned above the paper carrying guide 28, and are journalled on the side plate of the base 4 by means of a shaft 58 which is rotatable on an axis parallel to the drive roller 20.

The lateral width of the mobile guiding plate 54 is set at a value almost identical with the lateral width of the carrying guide 28. The mobile guiding plate 54 rotates on the shaft 58 between a condition where it is mounted on the upper surface of the upper cover 8 (shown with a solid line in FIG. 1) and a condition where it rises at an angle in the upper part of the carrying guide 28 (shown with an imaginary line).

A built in concave portion 60 for engaging the mobile guiding plate 54 at an angle is engraved on the paper carrying guide 28.

Next, the operation of this embodiment will be described.

In the case where the original 50 from the front of the scanner proper 2 is discharged at the back, the mobile guiding plate 54 is mounted on the upper cover 8 shown with a solid line in FIG. 1.

The original 50 is inserted between the guides 26 and 36 from the table 30 at the front of the scanner 2 by hand. When the original 50 is inserted between the rollers 18 and 32, the original 50 is moved onto the reading sensor 10 by the rotation of the drive roller 18 which is moved by the motor M. The original 50 is read at this stage.

Figure 3:
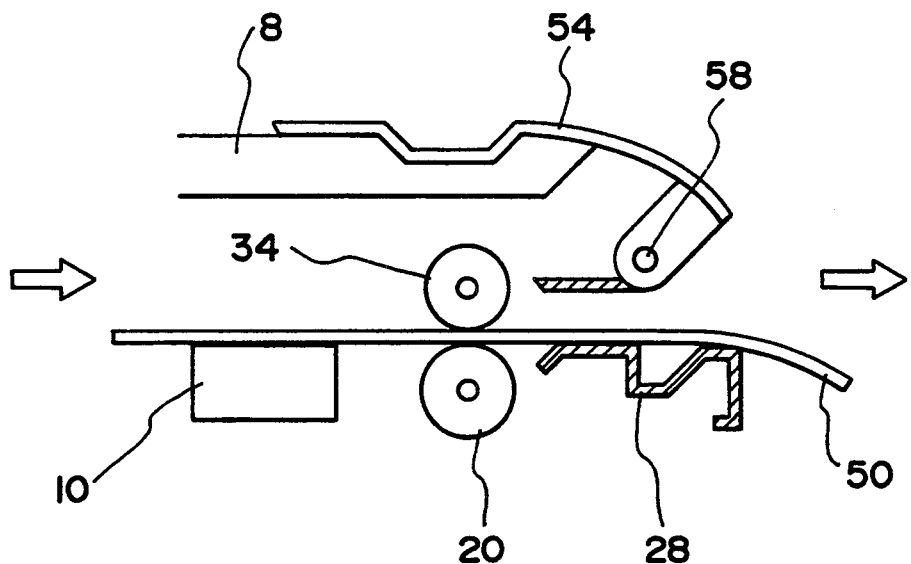
FIG. 3 is an explanatory side view of a paper discharge and guiding device showing the discharging of the original to the back of the scanner.

After, the original 50 is moved along the paper-carrying guide 14 by the rollers 18 and 32, and is inserted between the rollers 20 and 34. Then, the original 50 is carried to the discharge end of the paper carrying guide 28 by the rotation of the drive roller 20, and from there, it is dropped and discharged at the back of the scanner 2 as shown in FIG. 3.

After the original 50 is read in the case where it is to return the front of the scanner proper 2 an upward-motion U-turn from the back of the scanner proper 2, is made. At this stage the mobile guiding plate 54 rotates in the clockwise direction as shown in FIG. 1 on the shaft 58, and the bottom end of the mobile guiding plate 54 is engaged with the perpendicular surface of the built in concave portion 60. In this condition, the mobile guiding plate 54 is rising at an angle on the carry guide 28 as shown in dotted line in FIG. 1.

Figure 4:
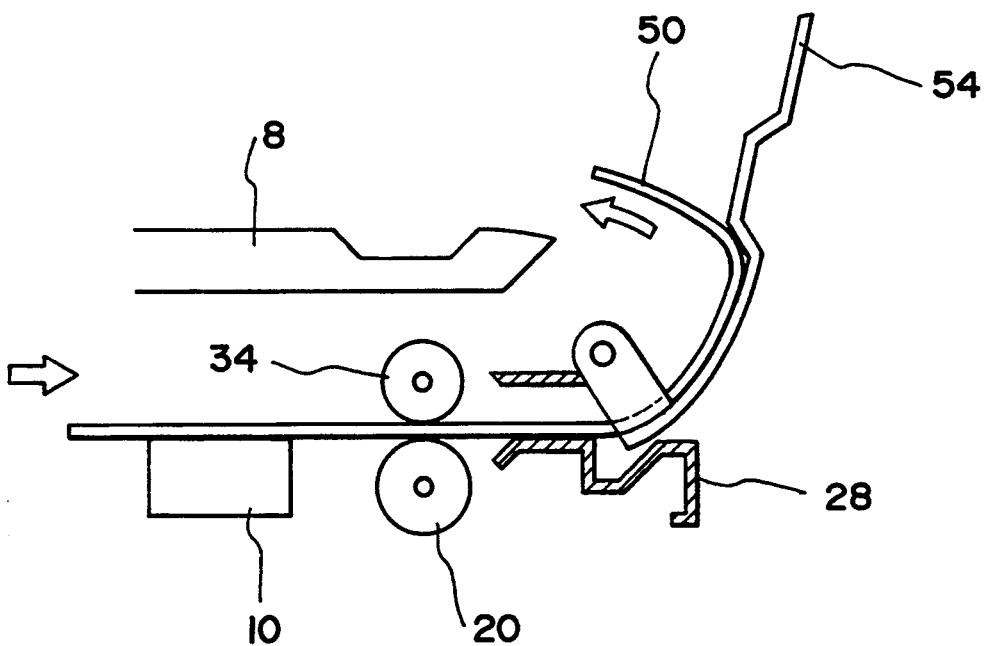
FIG. 4 is an explanatory side view of a paper discharge and guiding device, showing how the discharging of the original to the front of the scanner operates.

In the foregoing condition, the original 50 moved on the carrying guide 28 moves along the mobile guiding plate 54 as shown in FIG. 4, and thus makes a U-turn toward the front of and along the scanner 2.

Another embodiment will be described in the following by referring to FIG. 5 to FIG. 8.

Reference numeral 62 denotes a mobile guiding plate, of which both sides are rotatably journalled at 64 on a slightly lower part of the rear end of the carrying guide 28a by means of a shaft 64. One end of the mobile guiding plate 62 is set at almost an identical height with the rear end of the carrying guide 28a, and is adjacent to the rear end.

The other end of the mobile guiding plate 62 is supported on a receiving portion 66 found at a rear part of the base 4. Reference numeral 68 denotes a handle formed on the lower surface of the mobile guiding plate 62.

Reference numeral 8a denotes the upper cover supported on the base 4. A guiding plate support base 70 is fixed to the upper cover 8a, and a guiding plate for the upper side discharge 72 is fixed to the support base 70. A magnet 74 is mounted on the support base 70, and in correspondence to this magnet 74, a magnetic substance 76 is fixed to the side of the mobile guiding plate 62.

Other constructions which are identical with the construction shown in FIG. 1, and portions identical with FIG. 1 are given identical reference numerals.

Figure 7:
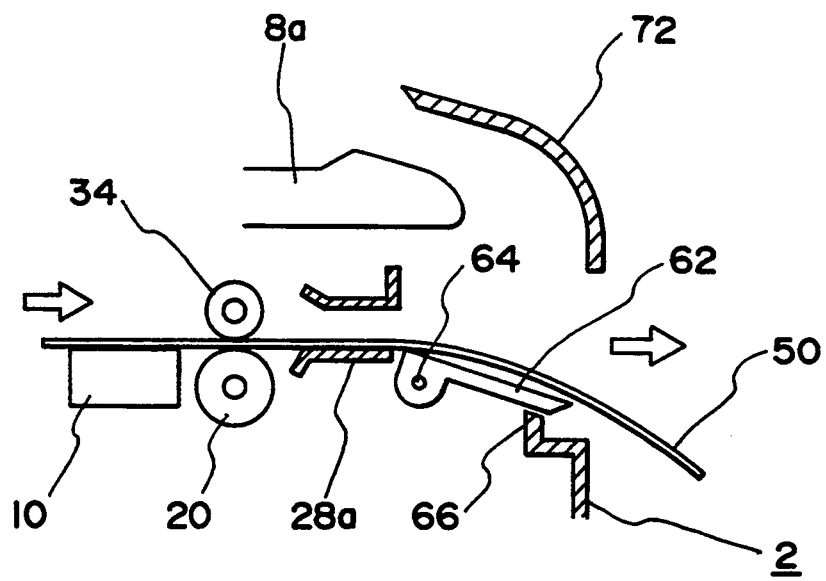
FIG. 7 is an explanatory side view of a paper discharge and guiding device showing the discharging of the original to the back of the scanner proper.

In the foregoing construction, in the condition where the mobile guiding plate 62 is engaged on the receiving portion 66, as shown in FIG. 7, the original 50 is guided to the back of the scanner proper 2. The mobile guiding plate 62 rotates upwardly on the shaft 64, and when the magnetic substance 76 is attracted to the magnet 74, the mobile guiding plate 62 is held up at an angle.

Figure 8:
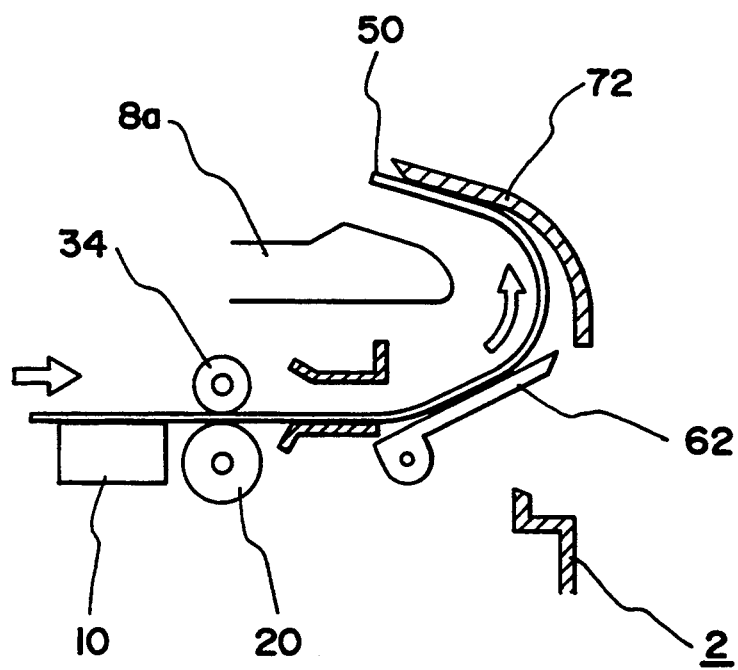
FIG. 8 is an explanatory view of a paper discharge and guiding device showing the discharging of the original at the front of the scanner proper.
Figure 9:
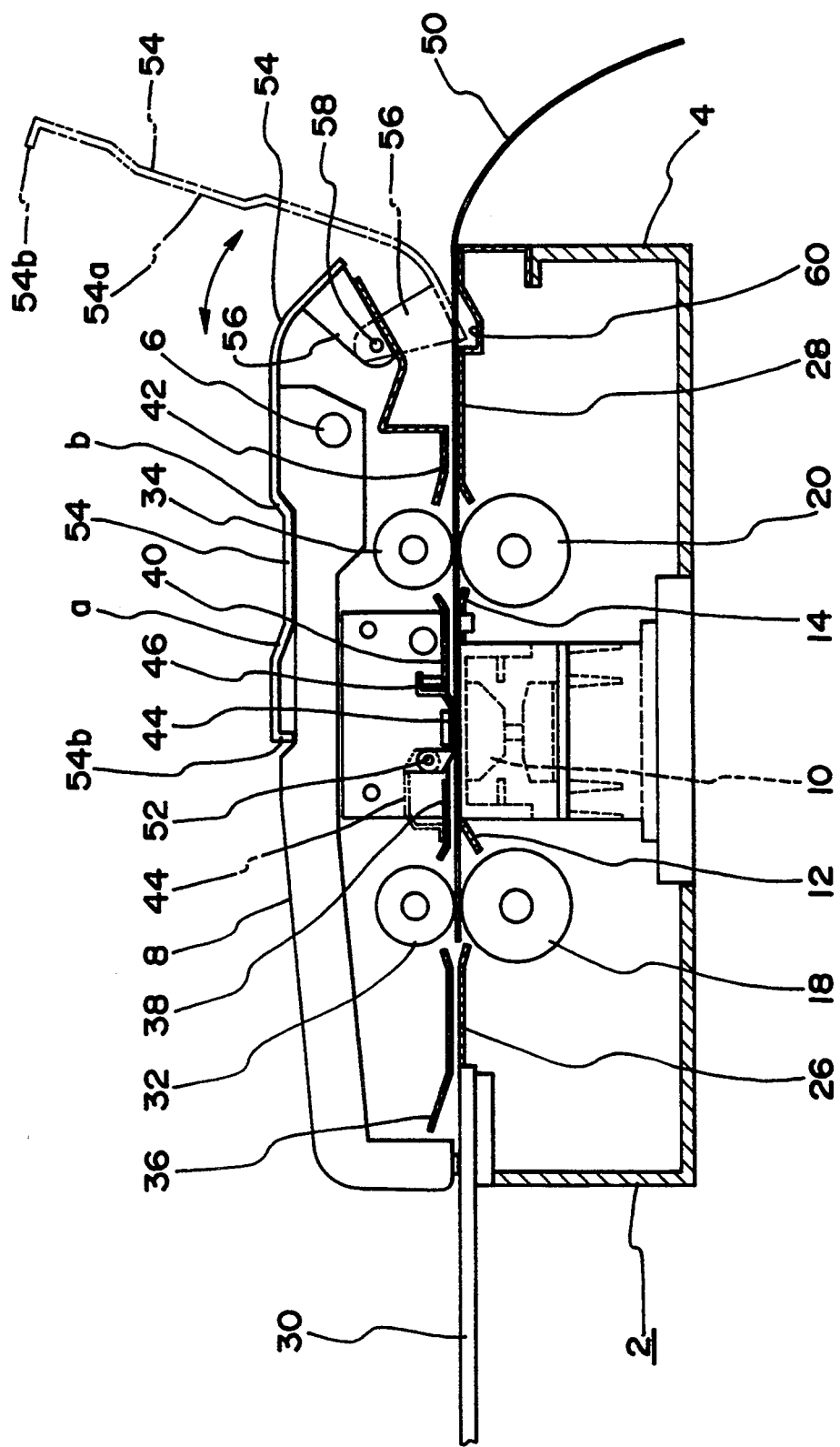
FIG. 9 is a cross section of the side of another embodiment of the paper-carrying type scanner.
Figure 10:
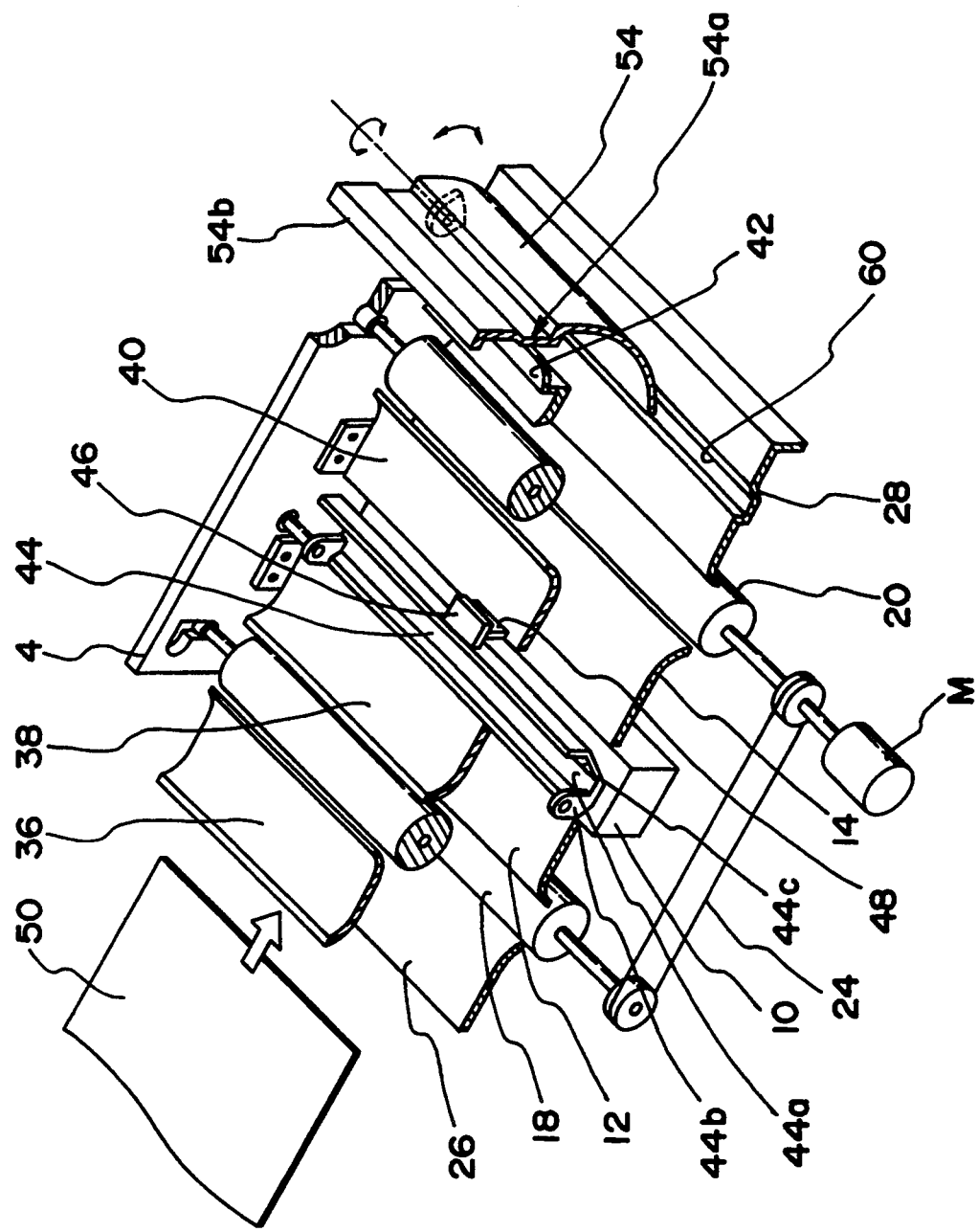
FIG. 10 is a sketch showing a partial cutaway of the paper-carrying type scanner shown in FIG. 9.

In this condition, the original, moved onto the carrying guide 28a, is guided onto the guiding plate for upper side discharge 72 along the mobile guiding plate 62 (as shown in FIG. 8), and is guided along the curved surface of the guiding plate 72 to the front of the scanner proper 2 and onto the upper cover 8a.

Another embodiment will be described in the following by referring to FIG. 9 to FIG. 13.

Almost in the center of the guiding surface of the mobile guiding plate 54, for guiding the original 50 at angle upward, a convex portion 54a, having moderate slope surfaces a and b at the front and rear end, is formed. At the end of the mobile guiding plate 54, an engaging projection 54b, to stop the advance of the original paper 50 is formed.

Other constructions which are identical with a construction of the embodiment shown in FIG. 1, and portions identical with FIG. 1 are given identical reference numerals.

Figure 13:
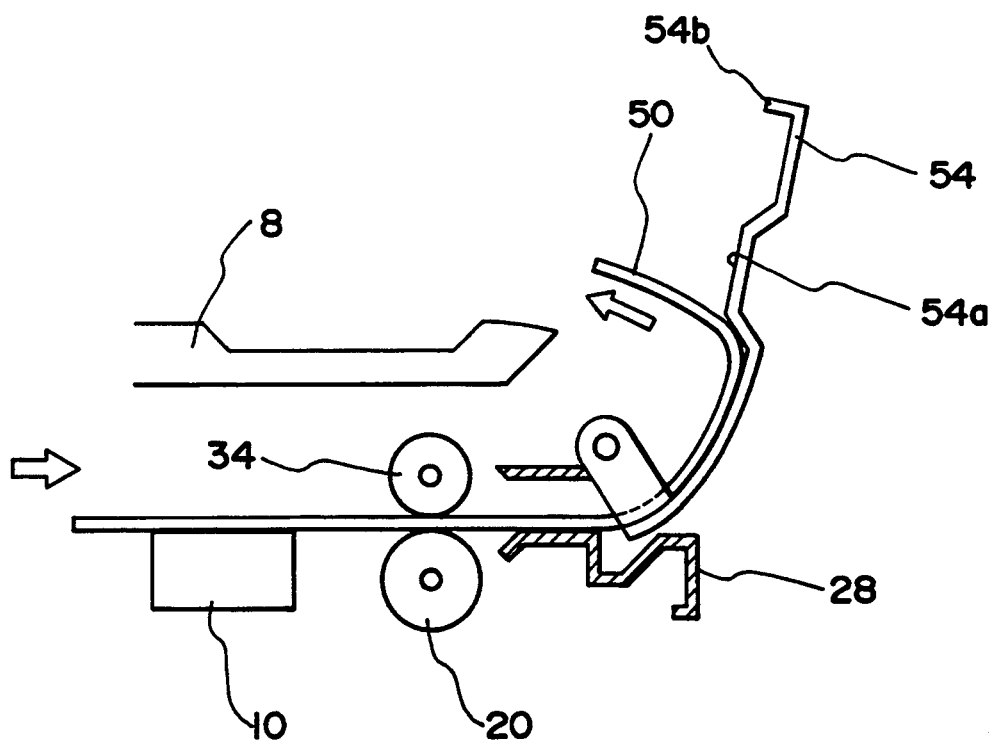
FIG. 13 is a side view for explanation of the paper-carrying type scanner shown in FIG. 9.

In the foregoing condition, the original 50 moved onto the carrying guide 28 rides along the mobile guiding plate 54 as shown in FIG. 13, and makes a U-turn to the front of and along the scanner 2.

Figure 11A:
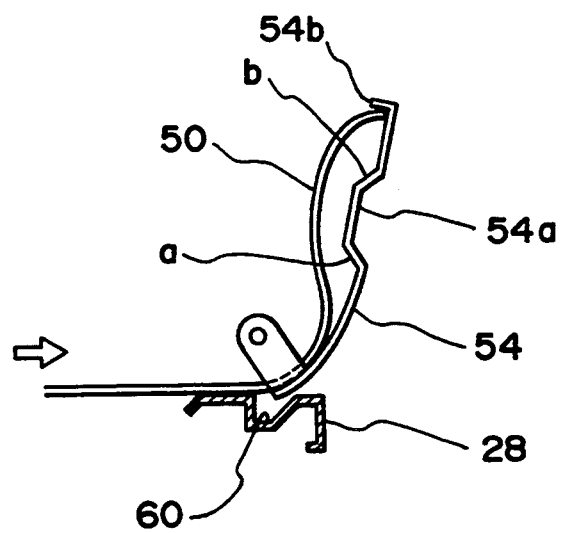
FIGS 11(a)–11(c) are side views explaining the operation of the paper-carrying type scanner shown in FIG. 9.
Figure 11B:
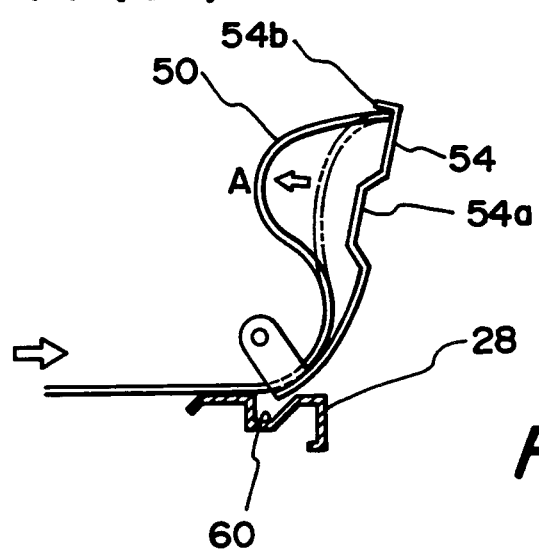
Figure 11C:
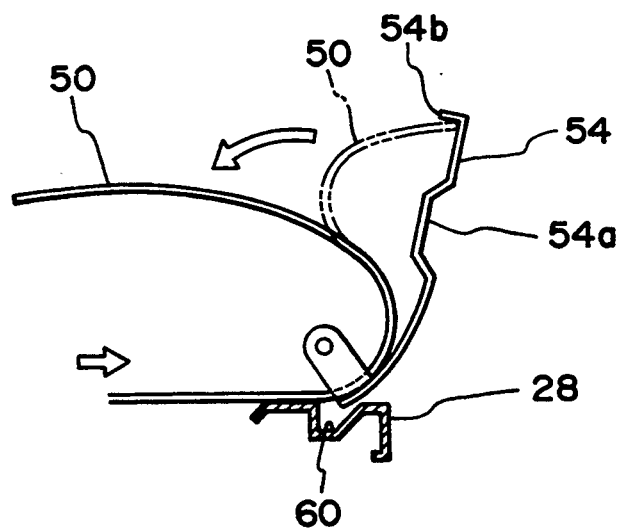
Figure 12:
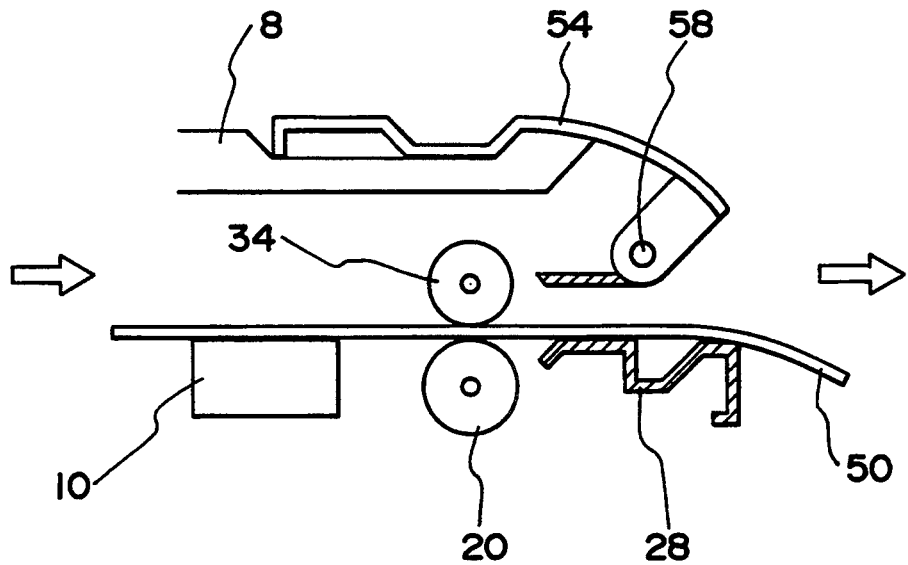
FIG. 12 is a side view for explanation of the paper-carrying type scanner shown in FIG. 9.

Even though the original 50, which has no curving tendency, is moving upward, it is not a problem. As it moves upward it is redirected to the front by the forward-guiding action of the convex portion 54a as soon as it touches it. However, if the edge of the original 50 has a downward curving tendency and touches the engaging portion 54b after moving over the convex portion 54a, the edge portion of the original 50 will catch in the engaging portion 54b and curve towards the front A of the scanner proper 2 as shown in FIG. 11B. Thus moving the original 50 in a forward direction. The curve formation is achieved smoothly by the convex portion 54a. When the curved portion of the original 50 becomes large, the edge portion of the original 50 is released from the engaging portion 54b by the dead weight of the original 50 and the edge of the original falls forward on the scanner proper 2 as shown in FIG. 11C. The movement of the original 50 is redirected forward, thus moving the original 50 to the front of the scanner proper 2.

Figure 14:
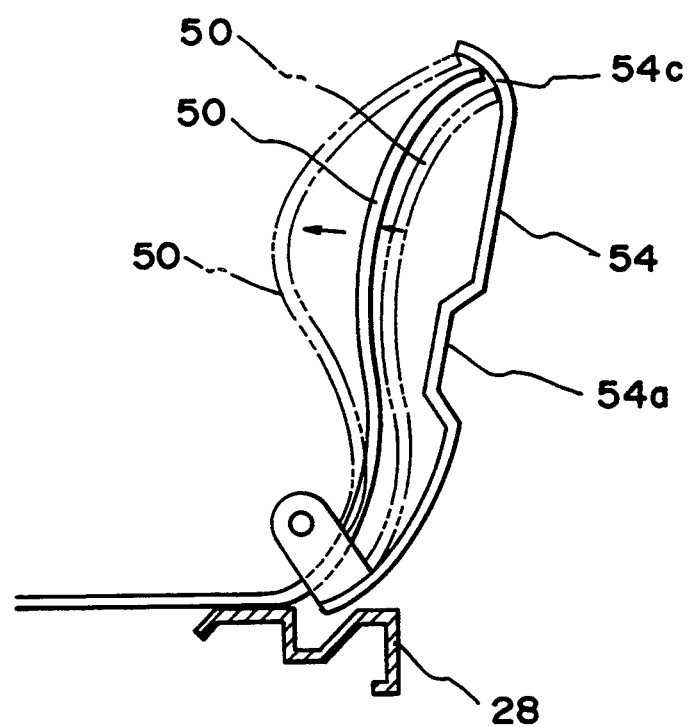
FIG. 14 is a side view for explanation of another embodiment.
Figure 15:
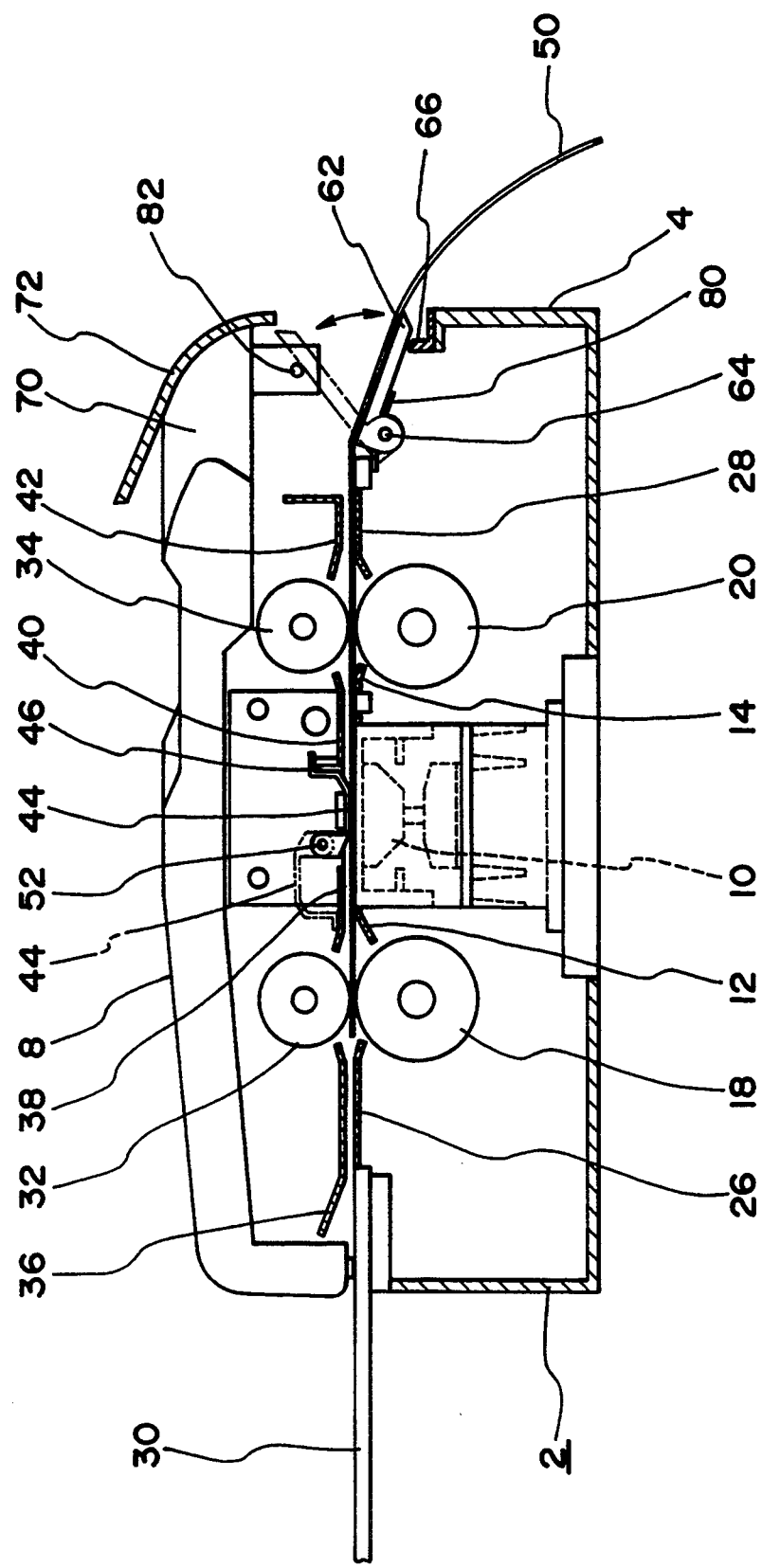
FIG. 15 is a cross section of the paper-carrying type scanner showing another embodiment.
Figure 16:
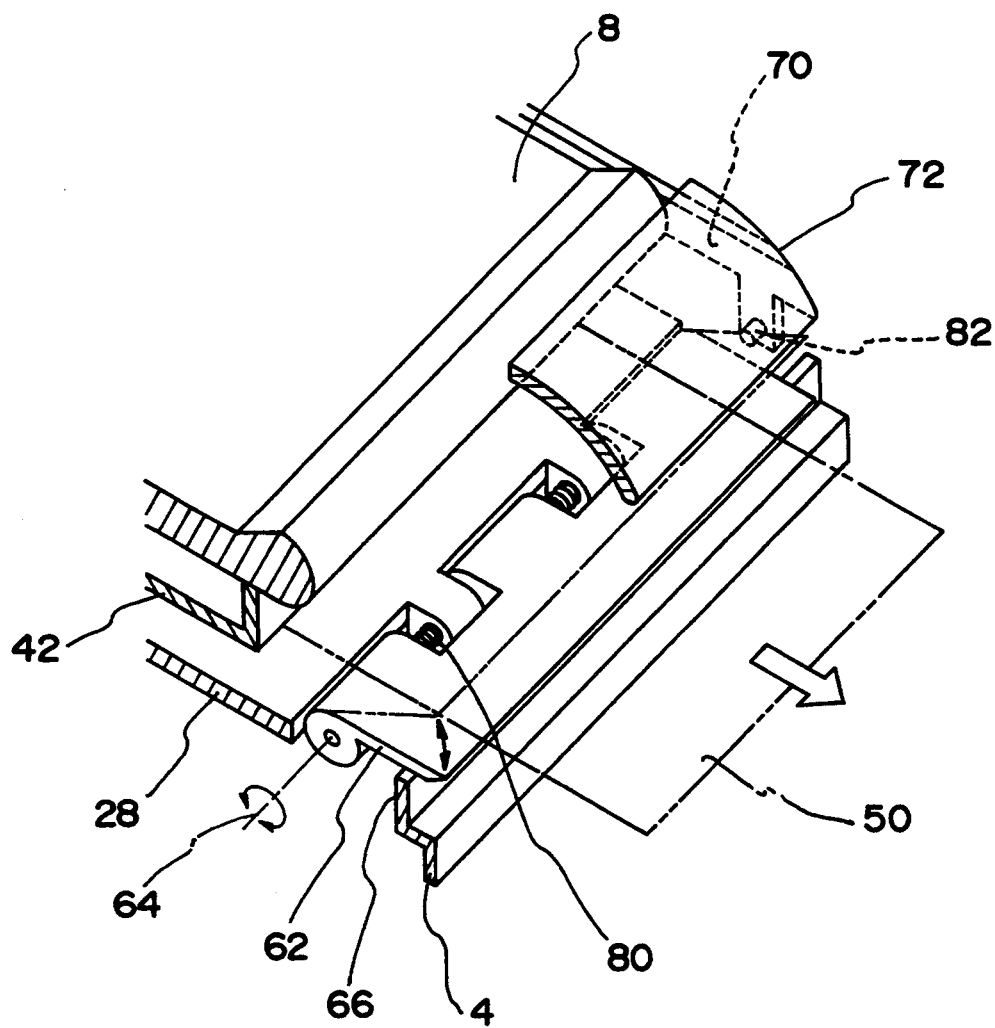
FIG. 16 is a sketch of the rear part of the paper-carrying type scanner shown in FIG. 15.

In addition, the engaging portion 54b may be constructed in such a way that a concave portion is formed on the upper part of the mobile guiding plate 54 as shown in FIG. 14. As well as the projection this concave curve is made as an engaging portion 54c.

Another embodiment will be described in the following by referring to FIG. 15 to FIG. 19.

Reference numeral 62 denotes a mobile guiding plate, with one end rotatably journalled on the scanner proper by means of a shaft 64. One end of the mobile guiding plate 62, adjacent to the rear end of the paper carrying guide 28 and the upper surface of one end of the mobile guiding plate 62, is set at a height almost identical with that of the upper surface of the guide 28. The open end side of the mobile guiding plate 62 is powered and raised by an energizing means 80 made of a twist spring. A stopper 82 is projected on the guiding support base 70 which is fixed to the cover 8 of the scanner proper 2. The side portion of the mobile guiding plate 62 is in contact with the stopper 82 resiliently, by the energizing force of the energizing means 80.

Figure 19:
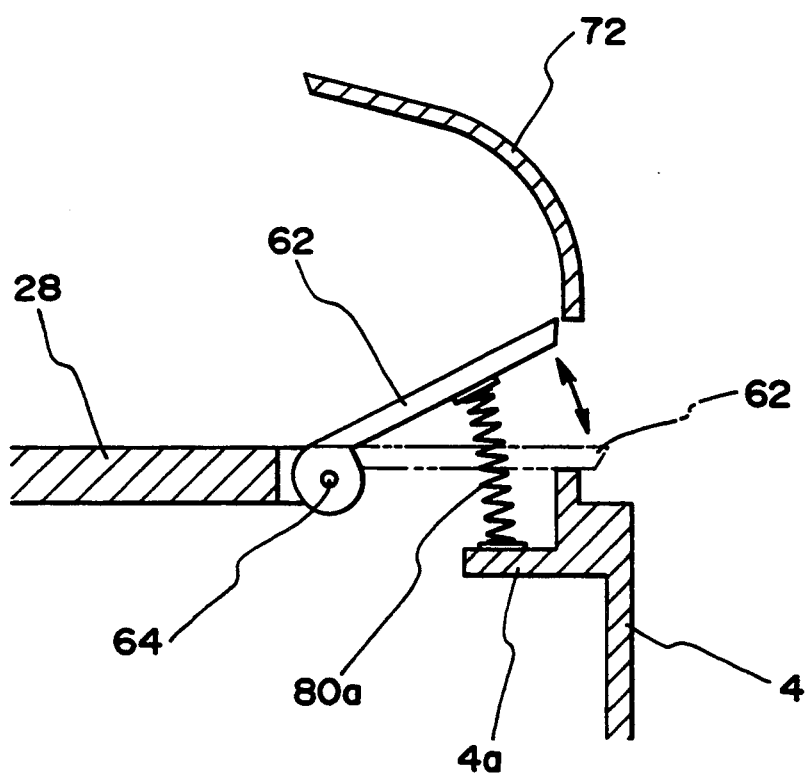
FIG. 19 is a cross section of another embodiment of the paper discharge and guiding device.

The energizing force of the energizing means 80 is normally set to lift the mobile guiding plate 62 upwards to a certain degree. The energizing force of the energizing means 80 is set to a degree where the mobile guiding plate 62 is pressed down by the pressure of the original 50, if the stiffness of the original 50 is strong at the time of its discharge. The energizing means is not particularly limited to the twist spring, and an additional energizing means 80a may be formed by a compression coil spring placed between the support portion 4a of the base 4 and the lower surface of the mobile guiding plate 62 as shown in FIG. 19.

Reference numeral 72 which denotes a guiding plate for discharge is fixed to the guiding plate support base 70. The lower end of this guiding plate for discharge 72 is opposed to the upper end of the mobile guiding plate 62. On the guiding plate for discharge 72, there is a guiding surface which is curved towards the front of the scanner proper 2 which guides the original 50 to the upper part of the upper cover 8.

Figure 5:
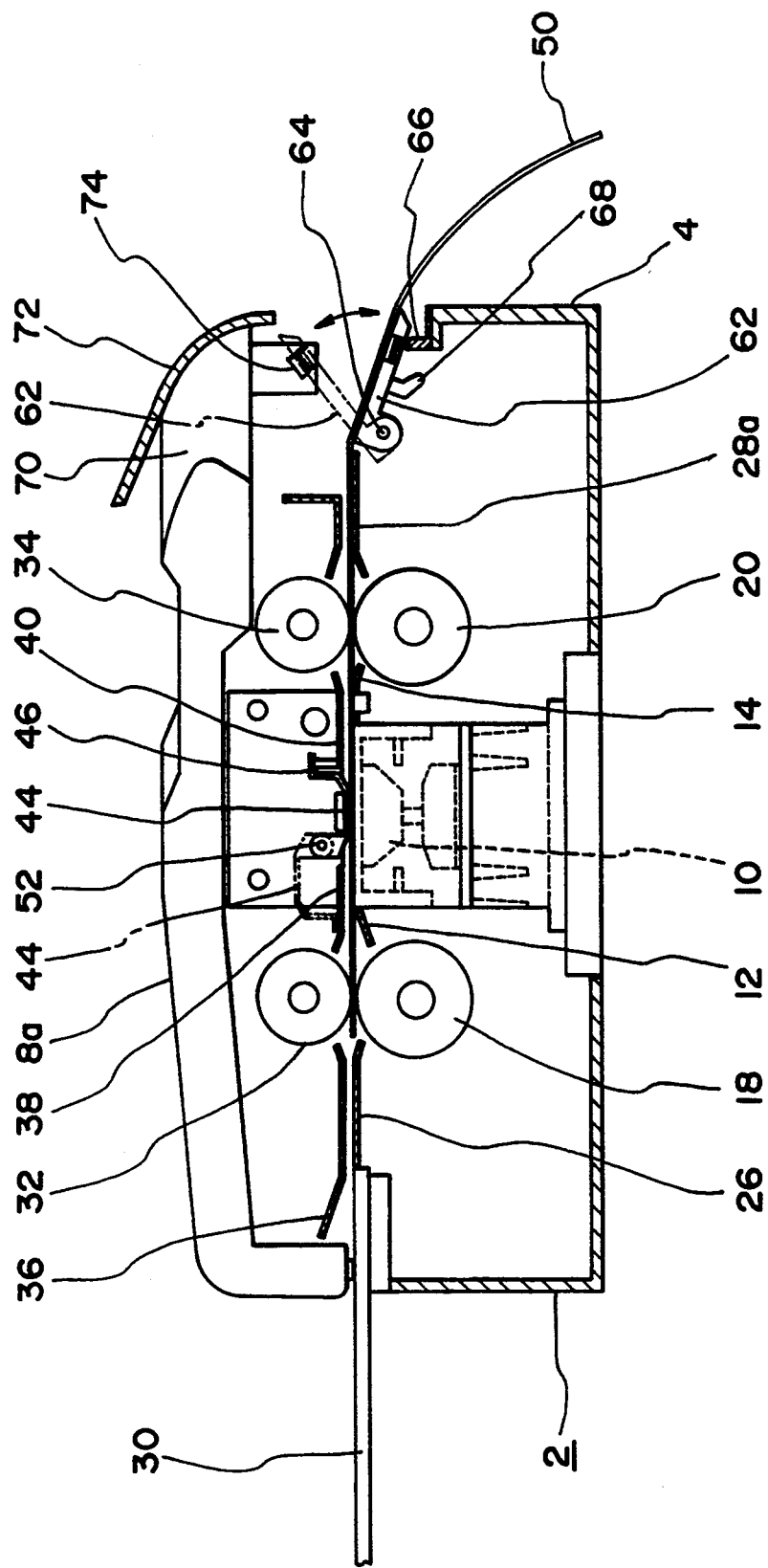
FIG. 5 is a cross section showing another embodiment of the paper-carrying type scanner.
Figure 6:
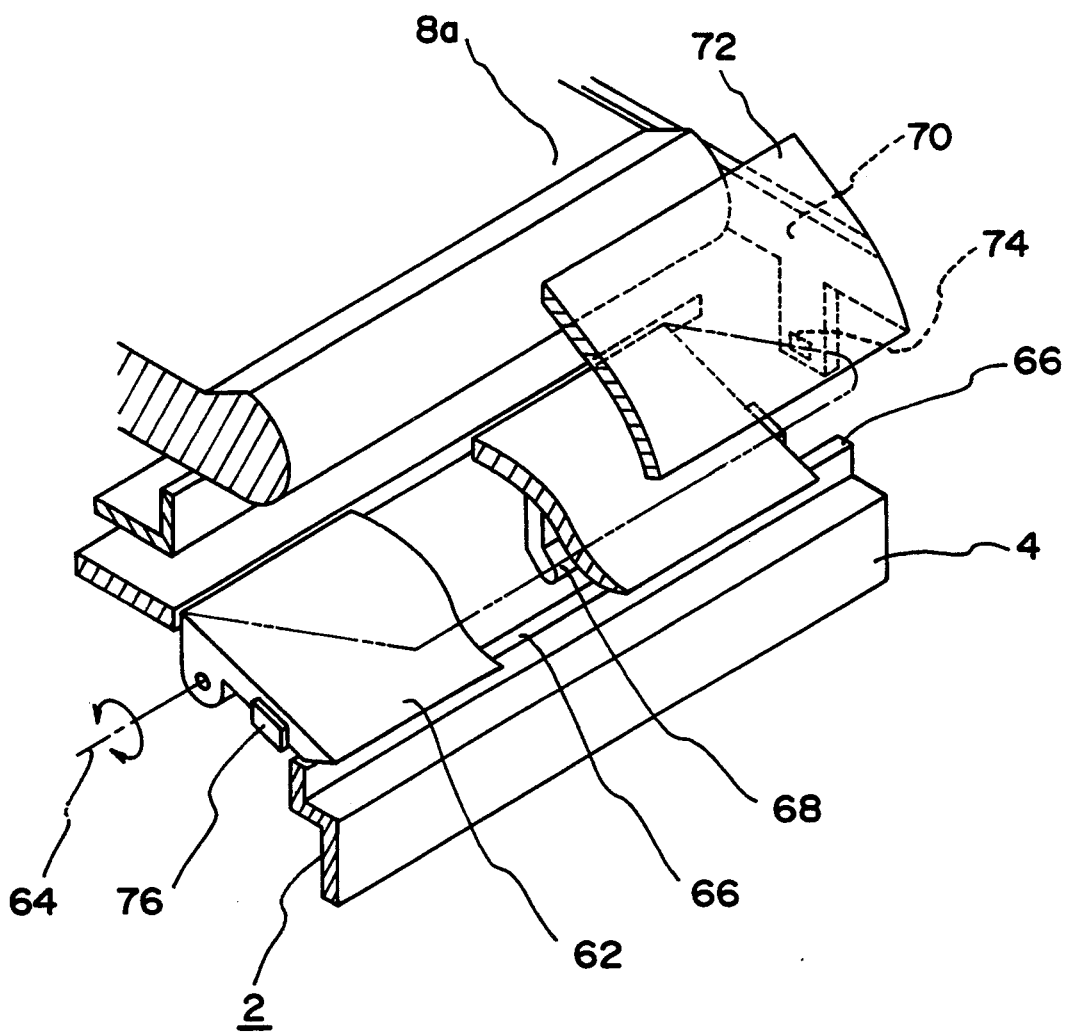
FIG. 6 is a sketch showing another embodiment of a paper discharge and guiding device.

Other constructions which are identical with the construction of the embodiment shown in FIG. 5, and the portions identical with FIG. 5 are given identical reference numerals.

The operation of the embodiment will be described in the following.

The original 50 is inserted by hand in the space formed between guides 26 and 36 from the table 30 at the front of the scanner proper 2. When the original is inserted in between the rollers 18 and 32, the original 50 is moved onto the reading sensor 10 by the rotation of the drive roller 18, which is moved by the motor, and the reading of the original 50 is achieved here.

Figure 18:
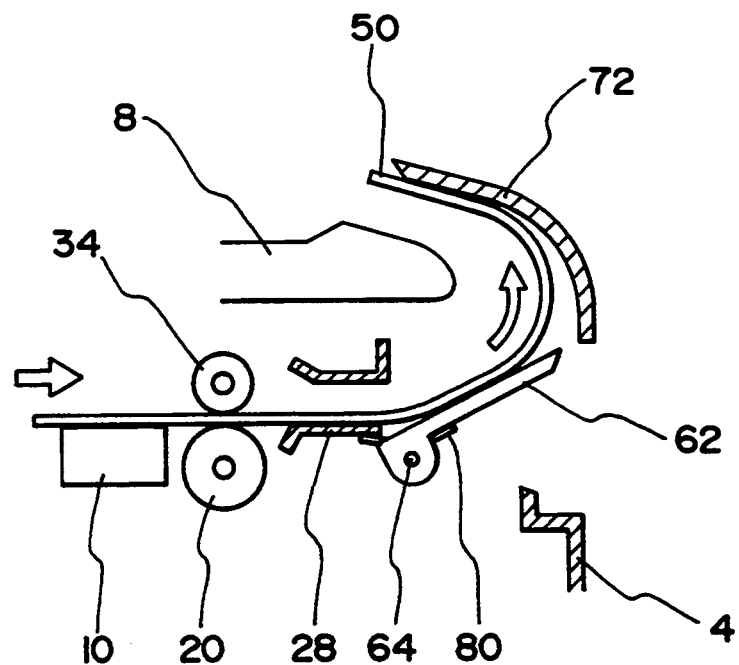
FIG. 18 is a side view for explanation of the paper discharge and guiding device showing the discharging of the original at the front of the paper-carrying type scanner proper shown in FIG. 15.

In the case of light/flexible paper, the original 50 moves onto the carrying guide 28, runs onto the mobile guiding plate 62, is guided onto the guiding plate for upper side discharge 72, and is guided towards the front of the scanner proper 2 onto the upper part of the upper cover 8, along the curved surface of the guiding plate 72 as shown in FIG. 18.

Figure 17:
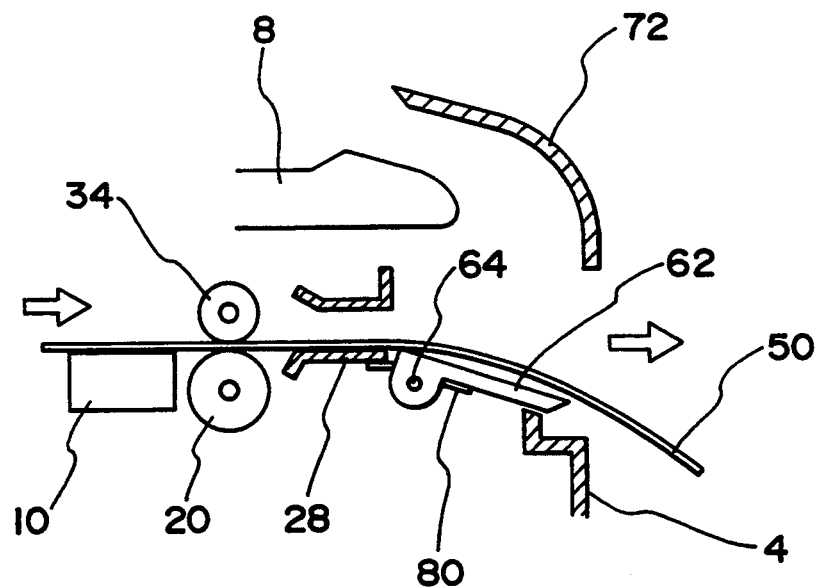
FIG. 17 is a side view for explanation of a paper discharge and guiding device, showing discharging of the original to the back of the paper-carrying type scanner.

In the case of stiff paper, the original 50 moves onto the carrying guide 28 and is discharged from the back of the scanner proper 2 after the mobile guiding plate 62 is pressed down by resisting the energizing force of the energizing means 80 as shown in FIG. 17.

As this embodiment is constructed according to the foregoing description, the discharging of the original at the front or rear of the scanner proper, can automatically be achieved depending on the stiffness of the original which produces the effect.

Another embodiment will be described in the following by referring to FIG. 20 to FIG. 26.

Figure 21:
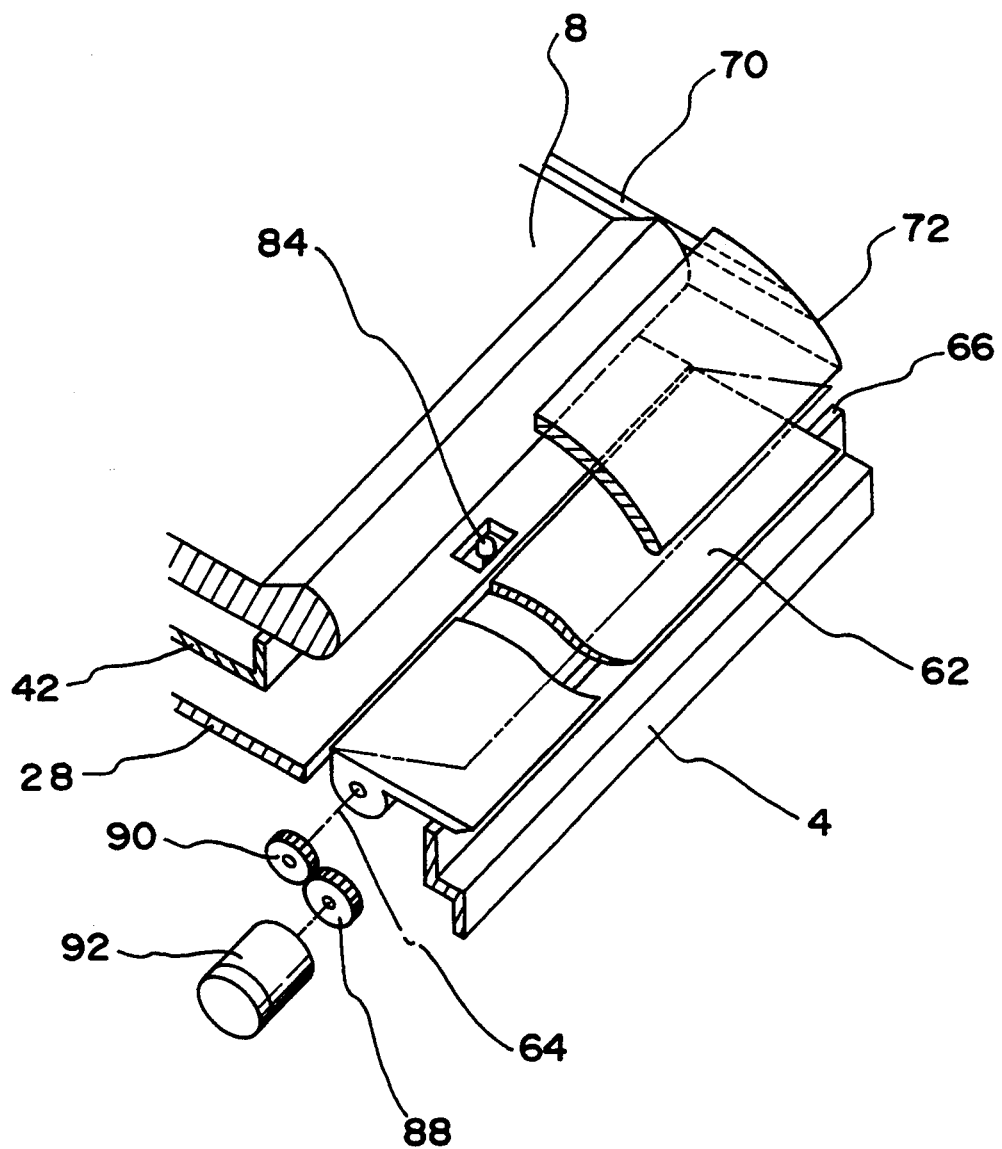
FIG. 21 is an appearance view of rear part of the paper-carrying type scanner shown in FIG. 20.
Figure 22:
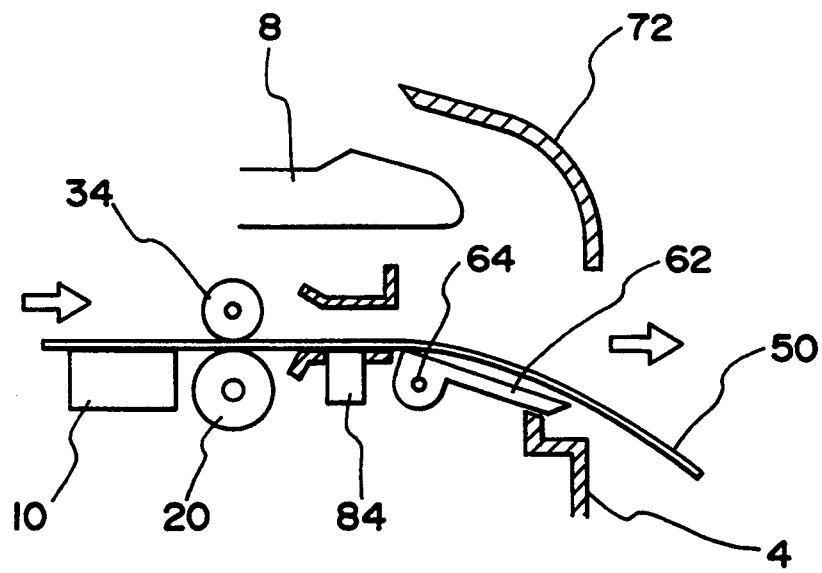
FIG. 22 is a side view for explanation of the paper discharge and guiding device shown in FIG. 20 showing the discharging of the original to the back of the scanner.

Reference numeral 62 denotes a mobile guiding plate, with one end journalled on the scanner proper 2 by means of a shaft 64. One end of the mobile guiding plate 62 is adjacent to the rear end of the paper carrying guide 28, and the upper surface of one end of the mobile guiding plate 62 is set at a height almost identical with that of the upper surface of the guide 28. The rotary shaft 64 of the mobile guiding plate 62 is connected to an output shaft of a rotary drive device 92 which is fixed to the base 4 by means of transmission gears 88 and 90 as shown in FIG. 21. The driving device 92 is composed of a motor which can be controlled by the controller. Reference numeral 86 denotes a paper-detection sensor which is positioned at the upper stream side of the drive roller 20 and is placed on the guide 14.

Figure 24:
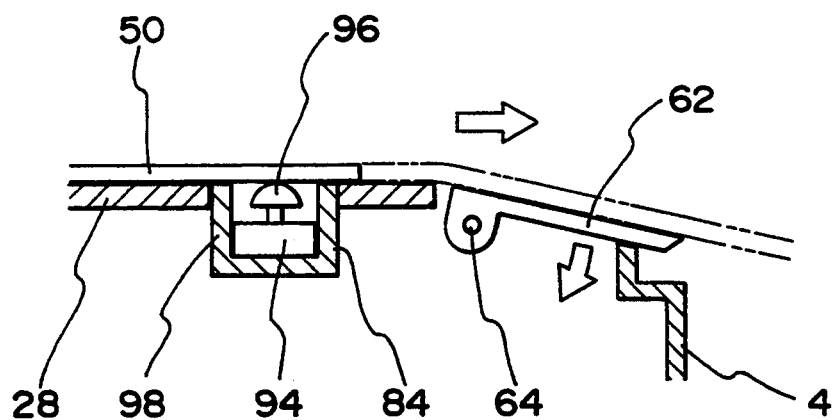
FIG. 24 is a cross section of the paper discharge and guiding device shown in FIG. 20 showing the discharging of the original to the back of the scanner proper.
Figure 25:
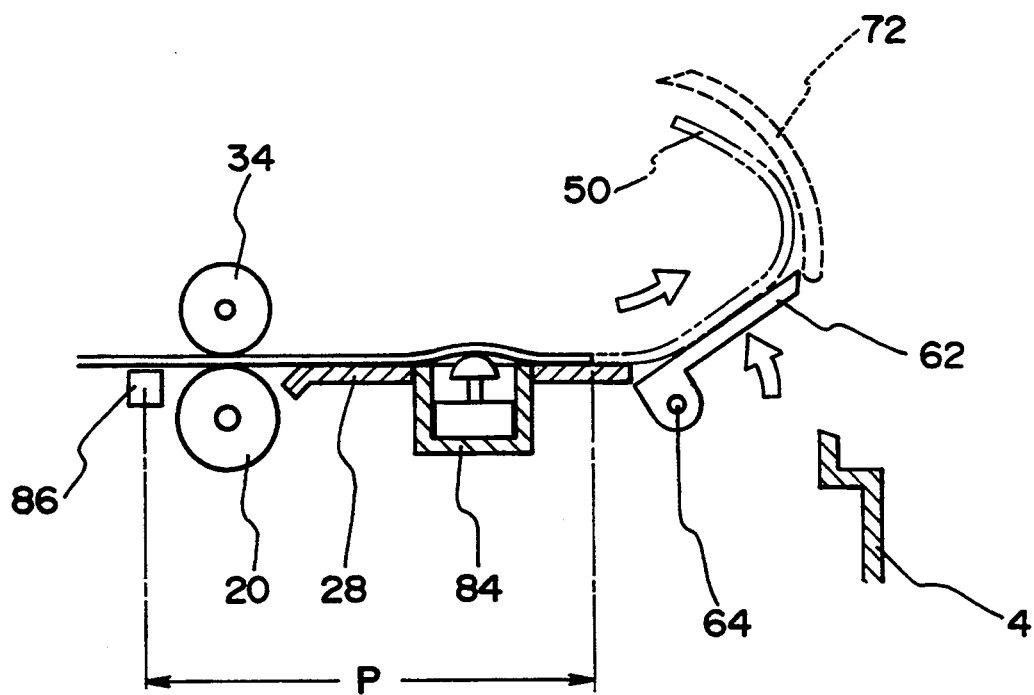
FIG. 25 is a cross section of the paper discharge and guiding device shown in FIG. 20 which shows the discharging of the original to the front of the scanner.

Reference numeral 84 denotes a paper stiffness-detection sensor, which is placed on the guide 28. This sensor 84 provides a built-in limit switch 94 which is built in to a casing 98, and a semispherical detector 96 is also fixed to the tip of the shaft of the limit switch 94 as shown in FIG. 24. The upper surface of the detector 96 projects slightly from the paper guiding surface of the guide 28. When the paper 50, which has a weak stiffness, passes over the surface of the guide 28, the detector 96 remains projecting from the surface of the guide 28 by the energizing force in its projection direction as shown in FIG. 25. When the original 50, which has a strong stiffness, passes over the surface of the guide 28, the detector 96 is pressed down, by the paper, as shown in FIG. 24 and activates the 'ON' switch. In addition, the paper-stiffness detection sensor is not particularly limited to the limit switch. The reflecting light may be applied to the original 50 to detect, by the sensor, the thickness of the original 50. Thus, the strength of the stiffness of the original 50 may be detected. Also, a fluctuation of the torque of the rear part drive roller 20 may be detected when the original 50 hits the drive roller 20, and the controller will be able to judge the exact strength of the stiffness of the original 50. Furthermore, the controller will be able to detect the change of the rotational speed of the drive roller 20 at that time, and will be able to judge the exact strength of the stiffness of the original on the basis of such a detection. Also, if an obstacle is provided on the original carrying passage and the edge of the original collides with the obstacle the maximum thrust of the original is detected and then the strength of the stiffness of the original is detected. Also, the frequency of fluttering of the original can be detected by a level sensor and the strength of the stiffness of the original may be detected on the basis of this detection.

Reference numeral 72 which denotes a guiding plate for discharge fixed to the guiding plate support base 70, is placed in the upper part of the mobile guiding plate 62. A guide surface for guiding the original 50 to the top of the upper cover 8 is formed on the guiding plate for discharge 72 which curves towards the front of the scanner proper 2.

Other constructions which are identical with the construction of the embodiment shown in FIG. 5, and the portions identical with FIG. 5 are given identical reference numerals.

Figure 26:
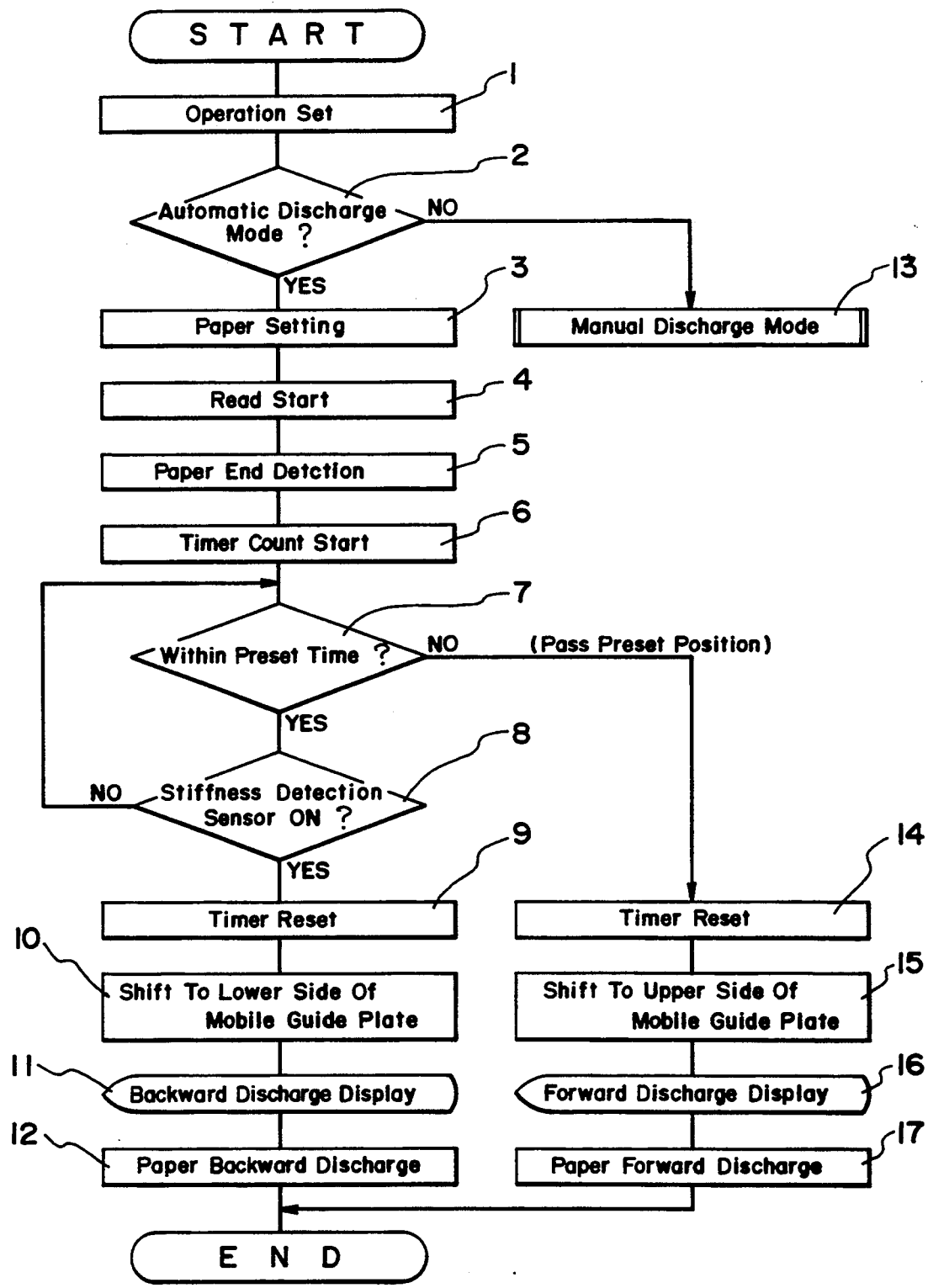
FIG. 26 is a flow chart showing the operation of the paper-carrying type scanner controller shown in FIG. 20.

Next, the operation of the embodiment will be described by referring to a flow chart shown in FIG. 26.

Firstly, the operator sets (step 1) the various parameters necessary for reading the original on a panel switch on the upper cover 8 and programs them into the controller. The controller judges whether or not an automatic discharge mode is set in judgement step 2, and when the affirmative judgement is made, indicates to the operator to prepare the paper in step 3. On the basis of this instruction, the operator puts the original 50 onto the table 30 manually, and inserts the original 50 between the drive roller 18 and the pressure roller 32. The controller detects the original by the sensor and starts the reading (step 4). The drive rollers 18 and 20 are set off when the sensor begins reading the original 50 is carried onto the reading sensor 10, and the original surface is read.

When the original 50 reaches the sensor 86, the sensor 86 is turned ON. The controller detects the turning of the sensor 86 to ON (step 5), and starts the timer counter (step 6). The controller judges if a predetermined time has been set after the sensor 86 is turned ON in step 7, and when the affirmative judgement is made, resets the timer, moves the drive device 92 in step 10, and turns the mobile guiding plate 62 (as shown in FIG. 24) in a clockwise direction, rotating on the shaft 64, until the open end side is touching the upper end of the base 4. Next, in step 11, reverse discharge mode is displayed.

The original 50 passes over the mobile guiding plate 62 by the rotation of the drive roller 20 and is discharged to the rear end of the scanner proper 2 (step 12). In the case where a negative is judged in step 8, namely, the original 50 has a weak stiffness, the controller confirms the passing of the original 50 through a predetermined position P (refer to FIG. 25) in step 7, then resets the timer in step 14, moves the driving device 92 in step 15, and turns the mobile guiding plate 62 to a predetermined angular position in an anticlockwise direction in FIG. 25. Next, the controller displays a forward discharge mode on a display unit of a panel switch in step 16. The original 50 moved to back of the scanner proper 2 by the drive roller 20 passes over the guiding plate 28 and then, is guided at an angle upward by the mobile guiding plate 62, is led to the guiding plate for discharge 72 which is placed upward, and is discharged at the front of the scanner proper 2. After the original 50 passes a predetermined position P, even if the stiffness detection sensor 84 turns ON, the mobile guiding plate 62 remains unmoved.

Figure 27:
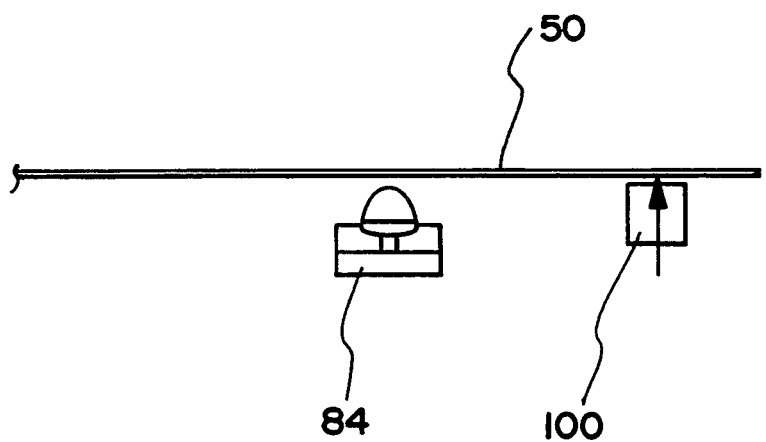
FIG. 27 is an explanatory view showing another embodiment.

In the case where a negative is judged in step 2, the mobile plate 62 is moved manually to a manual discharge mode that can be set at either the forward discharge position (step 13). In the foregoing embodiment, passing of the tip of the original 50 is detected by utilizing the sensor 86 which is necessary for the scanner. However as shown in FIG. 27, an exclusive sensor 100 can be separately provided at the predetermined P point, and the edge of the original can be detected. A flow chart showing the operation of the controller in this case is shown in FIG. 28.

Figure 28:
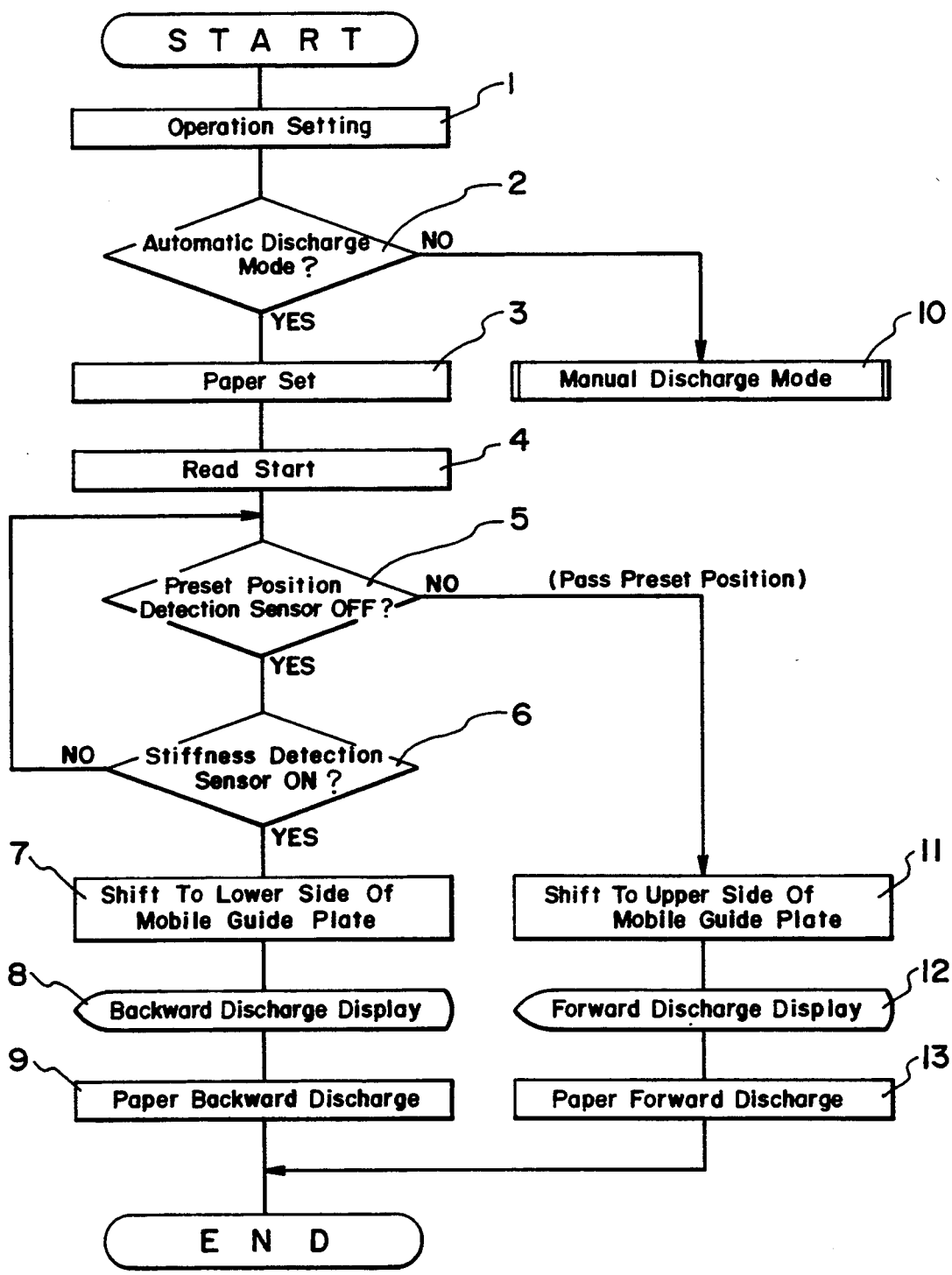
FIG. 28 is a flow chart showing another embodiment.

In FIG. 28, firstly, the operator set the setting of a various parameters necessary for the reading the original on the panel switch on the upper cover 8 (step 1), and programs them into the controller.

The controller judges whether or not an automatic discharge mode is set in the judge step 2, and when the affirmative is judged, the controller indicates to the operator to prepare the paper in step 3. On the basis of this instruction, the operator sets the original 50 on the table 30 manually, and inserts the original 50 between the drive roller 18 and the pressure roller 32. The controller detects the paper by the sensor, and starts the reading (step 4). When the reading begins the drive rollers 18 and 20 are rotated, the original 50 is carried onto the read sensor 10, and the original surface is read. The controller judges if the sensor 100 detects OFF, namely, the condition where original 50 is not detected, and if the affirmative is judged, the stiffness detection sensor 84 is ON or OFF in step 6. When the affirmative is judged, it moves the driving device 92 in step 7, and turns the mobile guiding plate 62 as shown in FIG. 24 in a clockwise direction rotating on the shaft 64 until the open end side touches the upper end of the base 4. Next, the rearward discharge mode is displayed in step 8. The original 50 passes over the mobile guiding plate 62 by the rotation of the drive roller 20, and is discharged at the back of the scanner proper 2 (step 9). When the negative is judged in step 6, namely, the stiffness of the original 50 is weak and the passing of the predetermined position P (refer to FIG. 27) is confirmed in step 5, the controller moves the driving device 92 in step 11, and turns the mobile guiding plate 62 to a predetermined angular position in an anticlockwise direction in FIG. 25. Next, the controller displays the forward discharge mode on the display unit of the panel switch in step 16. The original 50 moved back by the drive roller 20 passes over the guiding plate 28, is then guided at an angle upward by the mobile guiding plate 62, is led to the guiding plate for discharge 72, which is placed upward, and is discharged at the front of the scanner proper 2.

In addition, the construction in which the original 50 is guided backward or forward is not particularly limited to the construction of the mobile guiding plate 62 and the guiding plate for discharge 72. Another embodiment having the construction of guiding the original 50 backward and forward will be described in the following by referring to FIG. 29 to FIG. 32.

Reference numeral 54 denotes a mobile guiding plate, which has mounting plates fixed to both sides. These mount plates are positioned above the paper carrying guide 28, and are journalled on the side plate of the upper cover 8 rotating on an axis, which is parallel to the drive roller 20, by means of the shaft 58. On the paper carrying guide 28, a guiding surface for leading the paper to the rear end of the scanner proper 2 is formed.

The rotary shaft 58 of the mobile guiding plate 54 is connected to the driving device 102 which is fixed to the cover 8 by means of transmission gears 104 and 106. The mobile guiding plate 54 has a construction in which it rotates on the shaft 58 between the condition where it is mounted on the upper surface of the upper cover 8, as shown with a solid line, and the condition where it rises at an angle in the upper part of the carrying guide 28 as shown with imaginary line in FIG. 29.

Figure 20:
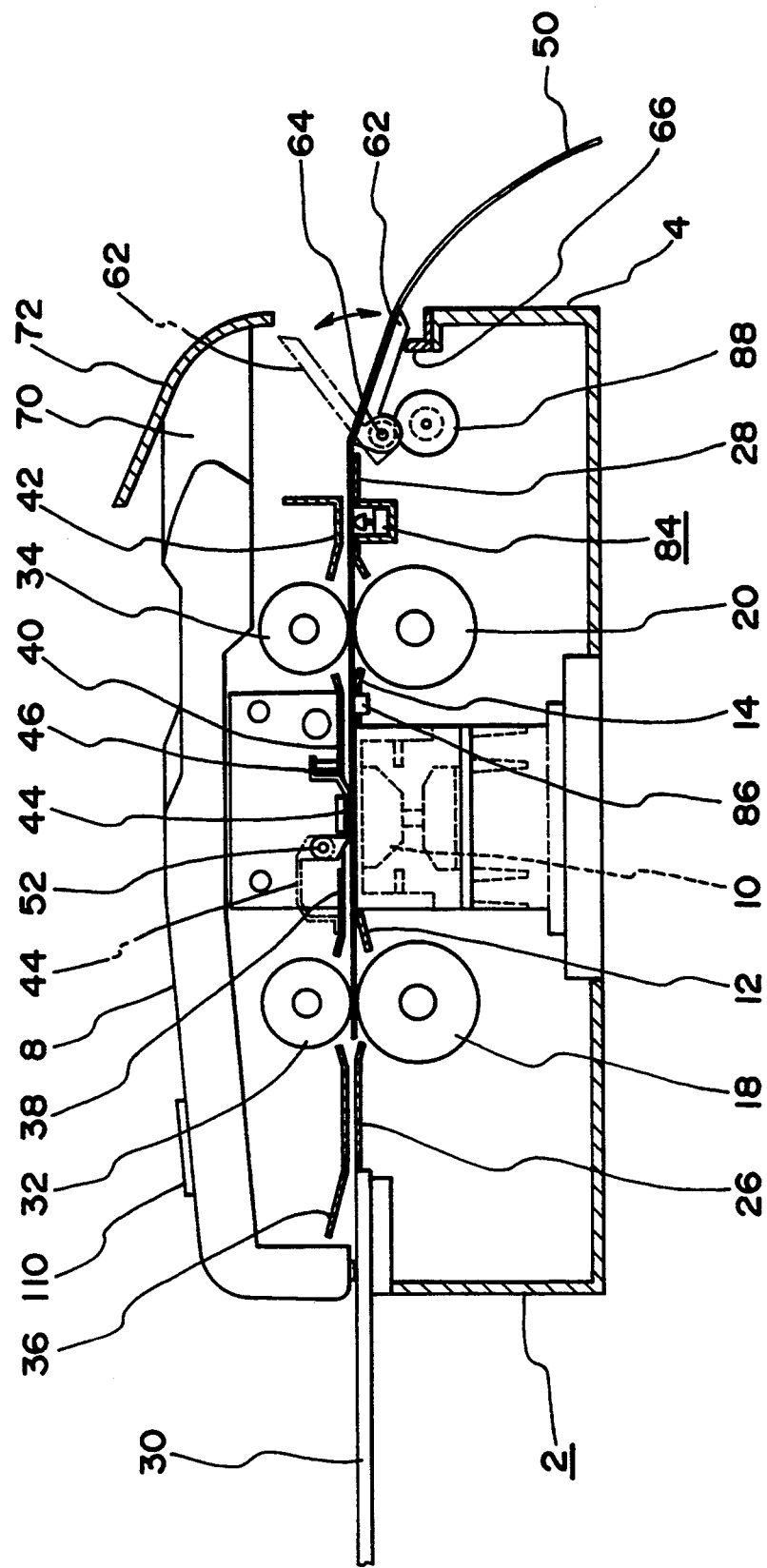
FIG. 20 is a cross section of the rear part of the paper-carrying type scanner showing another embodiment.

On the paper carrying guide 28, an engaging concave portion 60 for engaging the mobile guiding plate 54 at angular position is engraved. The upper cover 8 is journalled on the base 4 by means of the shaft 6. Other constructions similar to the construction shown in FIG. 20, are given identical reference numerals.

Figure 29:
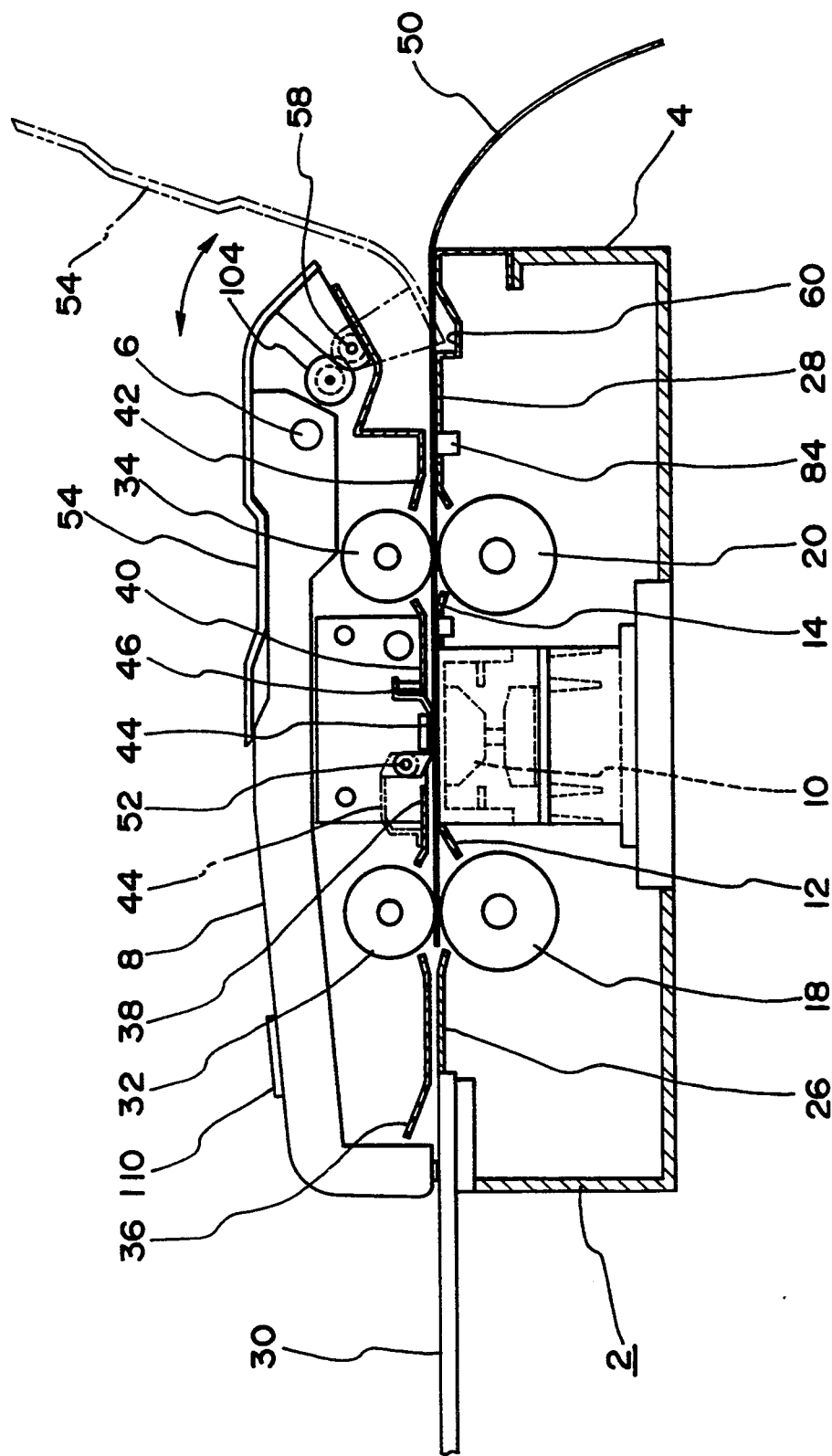
FIG. 29 is a cross section of the paper-carrying type scanner which shows another embodiment.
Figure 30:
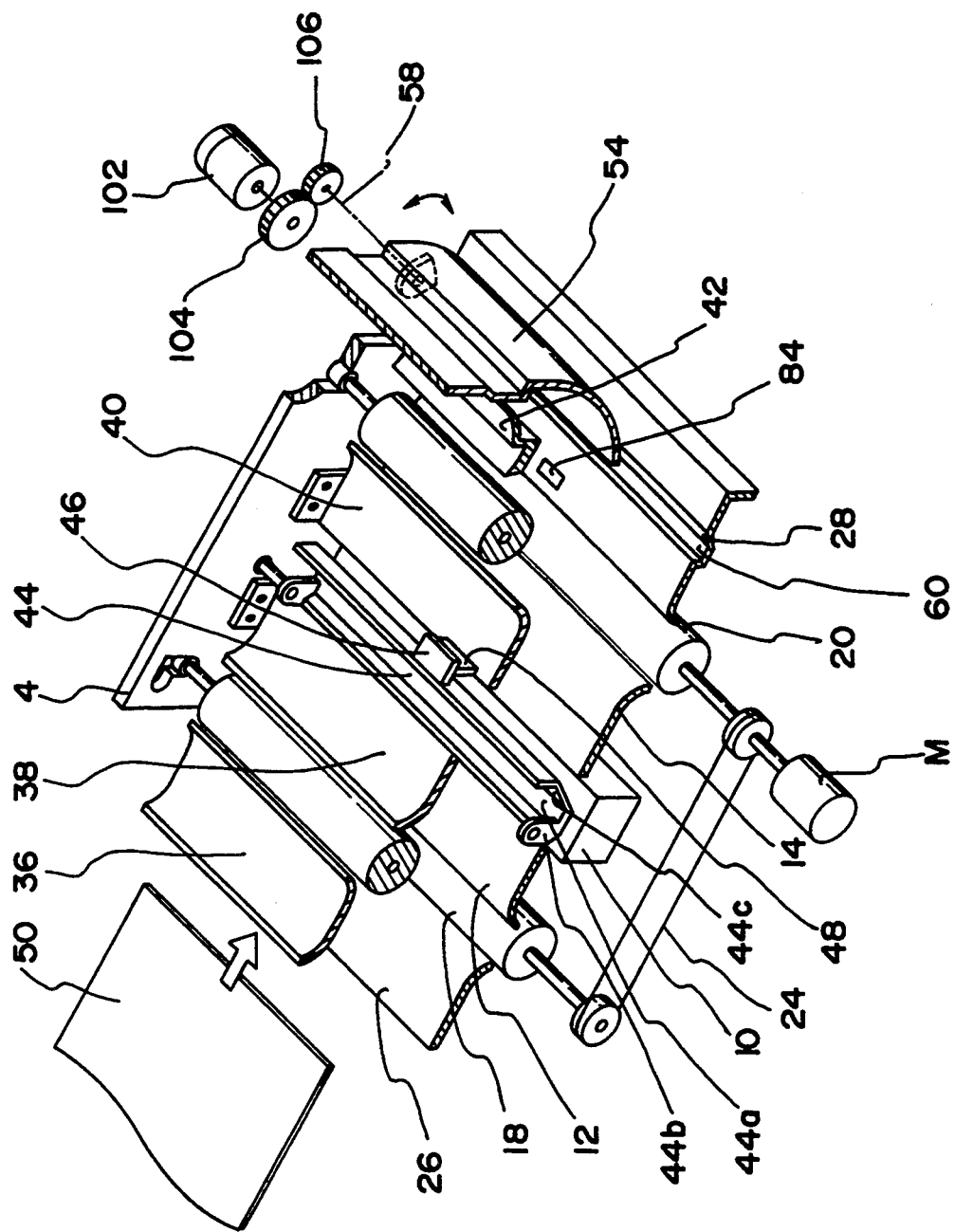
FIG. 30 is a sketch of the paper-carrying type scanner shown in FIG. 29.

As shown with a solid line in FIG. 29, in the condition where the mobile guiding plate 54 is mounted on the upper cover 8, the original 50 is discharged to the back of the scanner proper 2 after passing the carrying guide 28.

In the condition where the mobile guiding plate 54 rotates in a clockwise direction in FIG. 29 on the shaft 58 by the driving device 102, and one end of the mobile guiding plate 54, as shown with a dotted line in FIG. 29, is engaged with the perpendicular surface of the engaging concave portion 60, the mobile guiding plate 54 rises up at an angle on the carrying guide 28.

Figure 32:
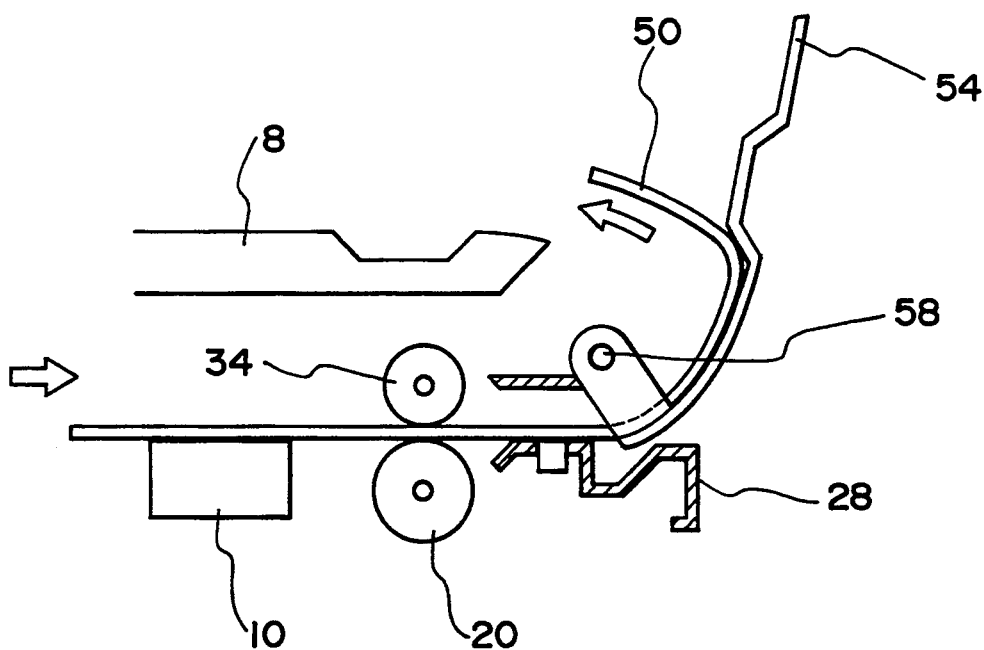
FIG. 32 is a side view for explanation of a paper discharge and guiding device showing an operation of discharging the original to the front of the scanner shown in FIG. 29.

In the foregoing condition, the original 50 moved onto the carrying guide 28 runs onto the mobile guiding plate 54 as shown in FIG. 32, and makes a U-turn toward the front of the scanner proper 2 along the guiding plate.

The embodiment is constructed as described in the foregoing, and also has the function of the automatic changeover from forward to rearward discharge of the original depending on the stiffness of the original.

Another embodiment will be described in the following by referring to FIG. 29 to FIG. 33.

Figure 33:
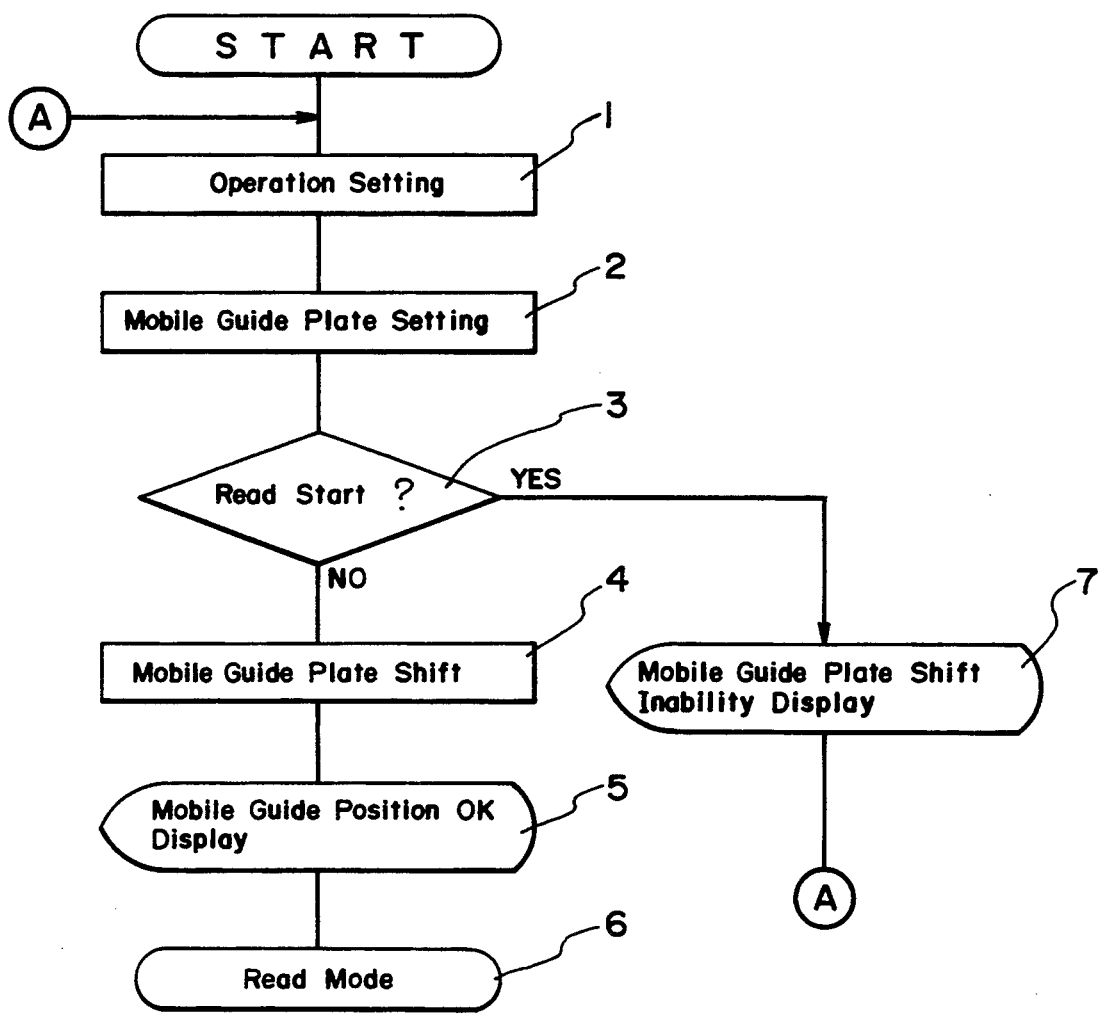
FIG. 33 is a flow chart showing another embodiment.

In this embodiment, the sensor 84 shown in FIG. 29 is not the paper-stiffness detection sensor and a known paper detection sensor is employed. Other constructions of the scanner are similar to the construction of the embodiment described in FIG. 29. In this embodiment, the program shown in the flow chart in FIG. 33 is stored in the controller.

Next, the operation of this embodiment will be described by referring to the flow chart of FIG. 33.

Firstly, the operator sets the various parameters, necessary for reading the original, on an control panel 110 of the controller provided on the upper cover 8 (step 1), and programs them into the controller.

Furthermore, the discharge of the original 50 to the front or back of the scanner proper 2 is programed into the controller by operating the control panel 110 in step 2, and the position of the mobile guiding plate 54 is designated. The controller judges whether or not the original 50 is positioned between the drive roller 18 and the paper-detection sensor 84, namely, it begins to start reading from the detection signals of the paper detection sensor (drawing is omitted) just before the drive roller 18 and the paper detection sensor 84 in step 3 in FIG. 33. When the affirmative is judged, mobile guiding plate shift inability is displayed on the display unit of the control panel 110, and thus, the mobile guiding plate 54 cannot be moved even if the control panel 110 is operated (step 7).

When the negative is judged in step 3, the controller drives the driving device 102 on the basis of the instruction of the control panel 110 in step 4, moves the mobile guiding plate 54, displays a mobile guiding plate shift OK on the display unit of the control panel 110 in step 5 and moves to the read mode. In the read mode, in the case where the rearward discharge is instructed, and as shown with a solid line in FIG. 29, the controller moves the driving device 102, the mobile guiding plate 54 is placed on the upper cover 8.

When the original 50 is inserted manually between the guides 26 and 36 from the table 30 in front of the scanner proper 2, and is then inserted between the rollers 18 and 32, the original 50 is moved onto the reading sensor 10 by the rotation of the drive roller 18 which is moved by the motor M and the reading of the original 50 is achieved here.

Figure 31:
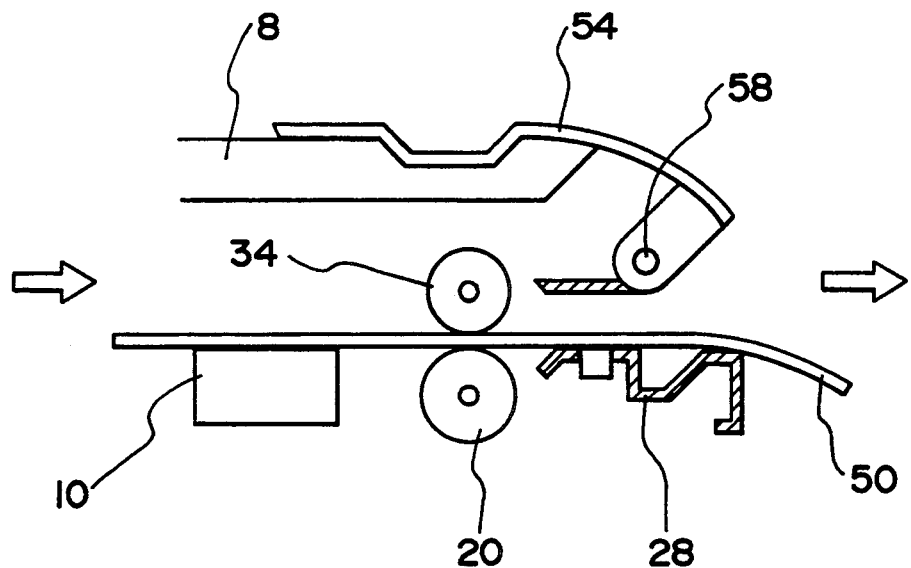
FIG. 31 is a side view for explanation of the paper discharge and guiding device, showing the operation of discharging the original to the back of the scanner shown in FIG. 29.

Furthermore, the original 50 moves on the paper carrying guide 14 by the rollers 18 and 32, is inserted between the rollers 20 and 34, and is dropped and discharged as shown in FIG. 31 at the back of the scanner proper 2, from the discharge end of the paper carrying guide 28 by the rotation of the drive roller 20.

In the case where the rearward discharge is instructed, the controller moves the driving device 102 which swivels the mobile guiding plate 54 in clockwise direction in FIG. 29 on the shaft 58 as shown with an imaginary line in FIG. 29. The mobile guiding plate 54 is then positioned upward at an angle on the carrying guide 28.

In the condition described in the foregoing, the original 50 moved onto the carrying guide 28 runs onto the mobile guiding plate 54 as shown in FIG. 32, and makes a U-turn toward the front of and along the scanner proper 2.

Another embodiment will be described in the following by referring to FIG. 20 to FIG. 23.

In this embodiment, the sensor 84 shown in FIG. 20 employs the paper detection sensor, which is on the market, instead of the stiffness sensor of the paper. Other constructions of the scanner are identical with the construction of the embodiment described in FIG. 20. In this embodiment, a program shown in the flow chart of FIG. 33 is stored in the controller.

The control panel 110 for operating the controller is provided on the upper cover 8.

In the foregoing construction, in the condition where the mobile guiding plate 62 is touching the receiving portion 66, as shown in FIG. 20, the original 50 is guided to the back of the scanner proper 2. When the mobile guiding plate 62 rises on the shaft 64, the mobile guiding plate 62 is positioned upward at an angle.

Figure 23:
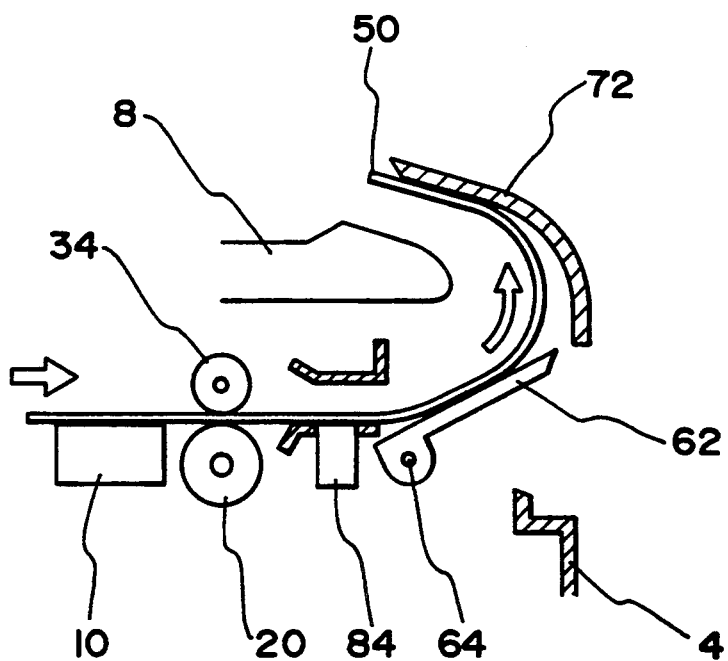
FIG. 23 is a side view for explanation of the paper discharge and guiding device showing the discharging of the original to the front of the scanner shown in FIG. 20.

In this condition, the original moved onto the carrying guide 28, as shown in FIG. 23, is guided along the mobile guiding plate 62 to the guiding plate for upper side discharge 72. It is then guided along the curved surface of the guiding plate 72 towards the front of the scanner proper 2 onto the upper cover 8. The changeover of the mobile guiding plate 62 can be achieved by operating the control panel.

The present embodiment is constructed as described in the foregoing, and the positioning of the mobile guiding plate can be changed by operating of the control panel and the changeover of the forward discharge and rearward discharge of the original can also be achieved.

What is claimed is:

1. A sheet discharge and guiding device in a scanner comprising a base, an upper cover mounted on said base, sheet passage means extending from a front end to a rear end of the scanner intermediate said base and said cover, feed means for feeding a sheet in a first direction through said passage means and a mobile guide plate having guide means for changing the direction of the sheet to a second, opposite direction, rotatable means rotatably mounting said mobile guide plate on said scanner above said passage means adjacent said rear end of said scanner for movement between a first position wherein said mobile guide plate extends upwardly at an angle to said passage means with an end of said mobile guide plate disposed in said passage means for changing the direction of a sheet moving in said passage means from the front end toward the rear end of said scanner upwardly and oppositely onto said cover and a second position wherein said mobile guide plate is disposed in overlying relation on said cover with said one end of said mobile guide plate removed from said passage means to permit a sheet to exit from the rear end of said passage means without contacting said mobile guide plate.

2. The paper discharge and guiding device in the scanner according to claim 1 in which the mobile guide plate is manually rotatable.

3. The paper discharge and guiding device in a scanner according to claim 1 in which the mobile guide plate is provided with a guide surface for guiding an original upward at an angle of the scanner, a convex portion projected almost at the middle of the guide surface, and an engaging portion for engaging the edge of the original which rides across the convex portion.

4. The paper discharge and guiding device in a scanner according to claim 3 in which the engaging portion is made of a projection.

5. The paper discharge and guiding device in a scanner according to claim 3 in which the engaging portion is made of a concave curved surface.

6. A sheet discharge and guiding device as set forth in claim 1, wherein said mobile guide plate is provided with a sheet engaging surface and wherein said guide means is comprised of a convex projection on said sheet engaging surface.

* * * * *